(12) United States Patent
Tadokoro et al.

(10) Patent No.: US 10,877,167 B2
(45) Date of Patent: Dec. 29, 2020

(54) RADIATION MONITOR AND METHOD OF ANALYZING RADIATION MONITOR

(71) Applicant: HITACHI, LTD., Tokyo (JP)

(72) Inventors: Takahiro Tadokoro, Tokyo (JP); Katsunori Ueno, Tokyo (JP); Yuichiro Ueno, Tokyo (JP); Kouichi Okada, Tokyo (JP); Shuichi Hatakeyama, Tokyo (JP); Yasushi Nagumo, Tokyo (JP); Yoshinobu Sakakibara, Tokyo (JP); Toru Shibutani, Tokyo (JP); Takahiro Itou, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/325,735

(22) PCT Filed: Aug. 8, 2017

(86) PCT No.: PCT/JP2017/028792
§ 371 (c)(1),
(2) Date: Feb. 15, 2019

(87) PCT Pub. No.: WO2018/043068
PCT Pub. Date: Mar. 8, 2018

(65) Prior Publication Data
US 2019/0204457 A1 Jul. 4, 2019

(30) Foreign Application Priority Data
Sep. 1, 2016 (JP) .................................. 2016-171085

(51) Int. Cl.
*G01T 1/208* (2006.01)
*G01T 1/20* (2006.01)
(52) U.S. Cl.
CPC ................ *G01T 1/208* (2013.01); *G01T 1/20* (2013.01); *G01T 1/2002* (2013.01)

(58) Field of Classification Search
CPC .......... G01T 1/20; G01T 1/2002; G01T 1/208
See application file for complete search history.

(56) References Cited

U.S. PATENT DOCUMENTS

| 5,757,425 A | * | 5/1998 | Barton | ................. H04N 5/3655 |
|---|---|---|---|---|
| | | | | 250/205 |
| 6,871,084 B1 | * | 3/2005 | Kingsley | ............. A61B 5/0408 |
| | | | | 398/183 |

(Continued)

FOREIGN PATENT DOCUMENTS

| EP | 416493 A2 | 3/1991 |
|---|---|---|
| JP | 03-004129 A | 1/1991 |

(Continued)

OTHER PUBLICATIONS

International Search Report of PCT/JP2017/028792 dated Oct. 31, 2017.

*Primary Examiner* — Taeho Jo
(74) *Attorney, Agent, or Firm* — Mattingly & Malur, PC

(57) ABSTRACT

Provided is a radiation monitor, including: a radiation detection unit which includes a radiation detection element, the radiation detection element emitting light of a predetermined light emission wavelength; a light emission unit which emits light of a wavelength different from the light emission wavelength; a wavelength selection unit which passes the light of the light emission wavelength, and is set to a first mode to block the light from the light emission unit; an optical transmission line which transmits the light; a light detection unit which converts the light passing through the wavelength selection unit into an electric pulse; and a control unit which measures a count rate of the electric pulse, and determines whether at least the light emission unit is degraded on the basis of the count rate and a light intensity of the light emission unit.

14 Claims, 15 Drawing Sheets

(56) References Cited

U.S. PATENT DOCUMENTS

| | | | |
|---|---|---|---|
| 2003/0057380 A1* | 3/2003 | Katagiri | G01T 1/2012 250/484.5 |
| 2004/0135098 A1* | 7/2004 | Katagiri | G01T 1/2012 250/484.5 |
| 2009/0014665 A1* | 1/2009 | Fleming | G01T 1/023 250/484.5 |
| 2010/0047916 A1* | 2/2010 | Rothschild | G01N 21/6402 436/98 |
| 2010/0096540 A1* | 4/2010 | Fleming | G01T 1/40 250/252.1 |
| 2010/0232279 A1* | 9/2010 | Stevenson | G11B 7/00455 369/100 |
| 2011/0210002 A1* | 9/2011 | Hsieh | C08K 5/20 204/549 |
| 2012/0037808 A1* | 2/2012 | Fleming | G01T 1/023 250/368 |
| 2015/0123002 A1* | 5/2015 | Ueno | G01T 1/10 250/362 |
| 2016/0252394 A1* | 9/2016 | Antila | G01N 21/65 356/519 |

FOREIGN PATENT DOCUMENTS

| | | |
|---|---|---|
| JP | 03-099292 A | 4/1991 |
| JP | 2006-234670 A | 9/2006 |
| JP | 2013-134157 A | 7/2013 |
| JP | 5336836 B2 | 11/2013 |

* cited by examiner

○ COUNT RATE IN FIRST MODE WHEN STARTING TO USE
● COUNT RATE IN FIRST MODE WHEN BEING MAINTAINED

○ COUNT RATE IN SECOND MODE WHEN STARTING TO USE
● COUNT RATE IN SECOND MODE WHEN BEING MAINTAINED

FIG. 13
(a)
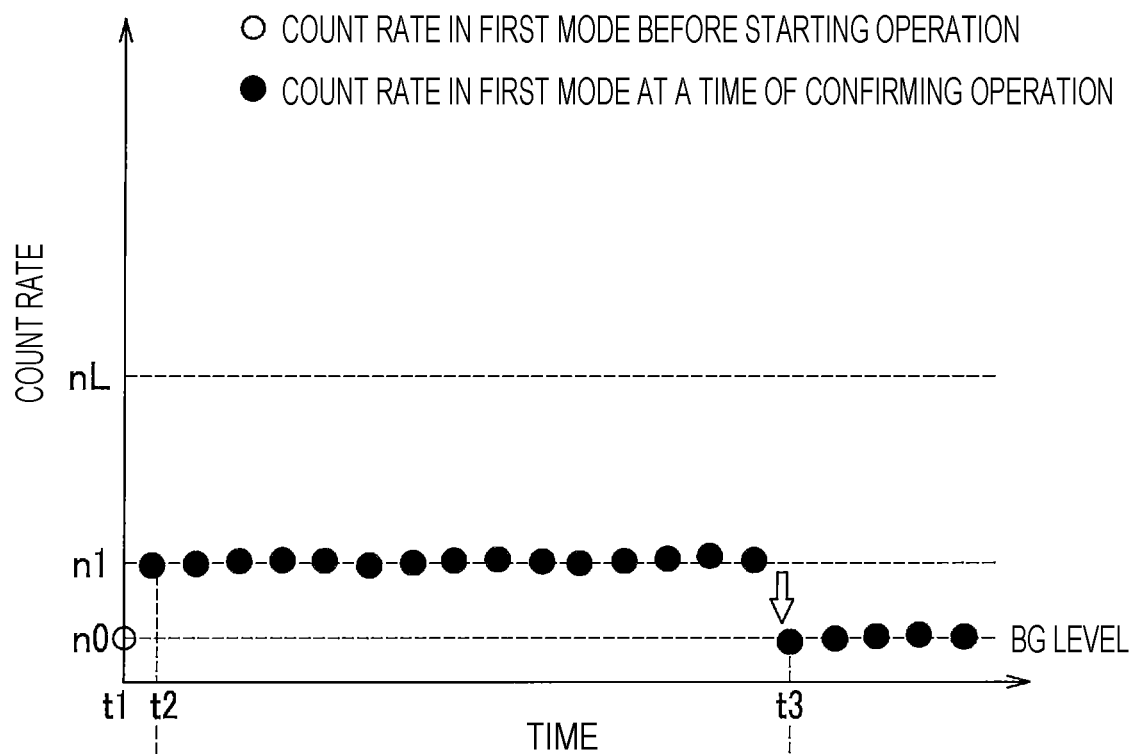
(b)
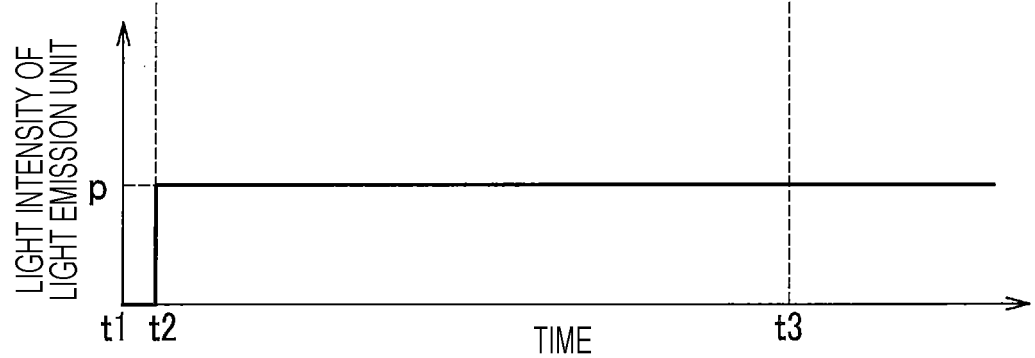

FIG. 14
(a)
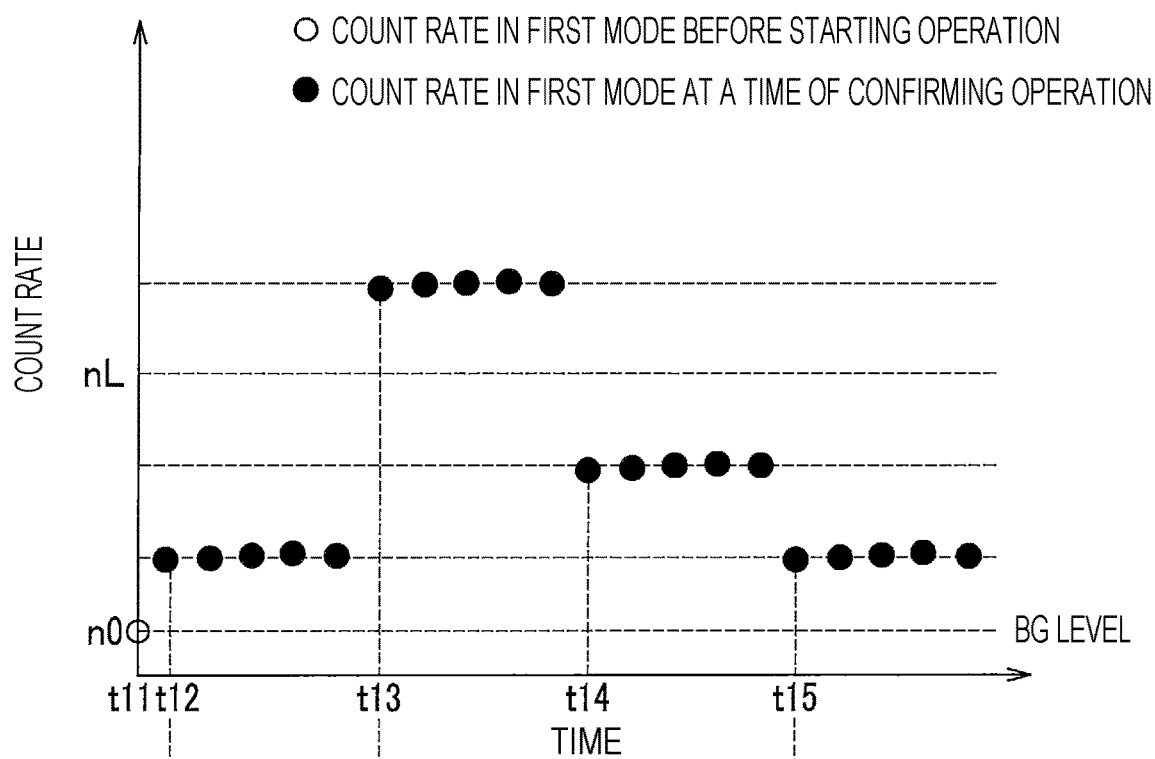
(b)
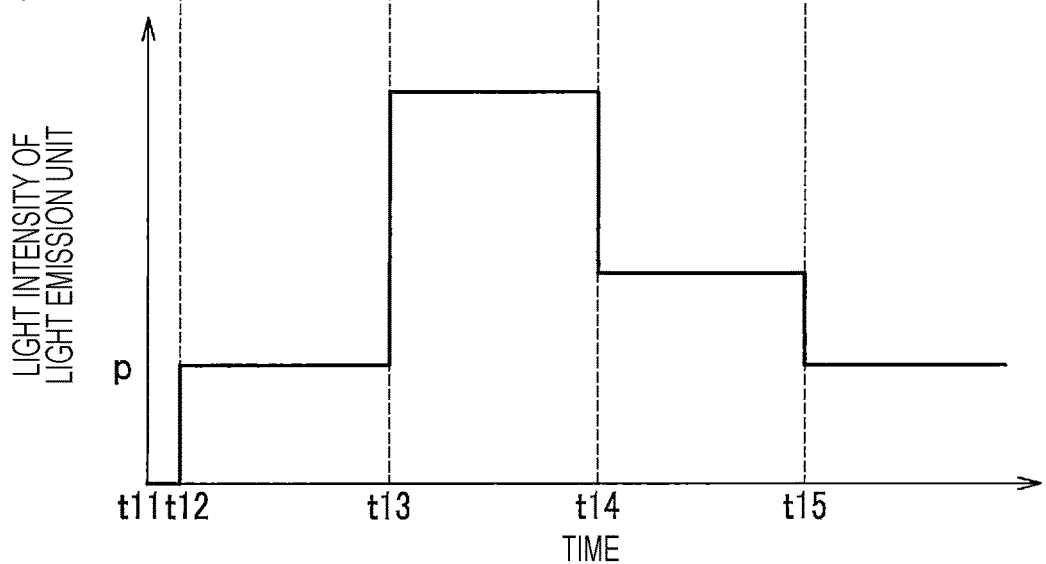

RADIATION MONITOR AND METHOD OF ANALYZING RADIATION MONITOR

TECHNICAL FIELD

The present invention relates to a radiation monitor and a method of analyzing the radiation monitor.

BACKGROUND ART

As for a radiation monitor, there is known a technique of determining whether the radiation monitor functions normally in case where radiation of a feeble radiation source (bug source) which is installed near, for example, a radiation detection element is not detected. However, in such a radiation monitor, the radiation lower than a dose rate of the radiation source is hardly detected. In addition, the radiation source needs to be frequently maintained.

PTL 1 discloses a technique of a radiation monitor which uses an optical pulse and does not require the radiation source.

In other words, the radiation monitor disclosed in PTL 1 includes a sensor unit which senses radiation and light, a signal processing unit which is connected to the sensor unit, a light emission unit which emits an optical pulse to the sensor unit, a light emission control unit which controls an operation of the light emission unit, and a coincidence counting unit.

The coincidence counting unit counts a signal from the signal processing and a signal from the light emission control unit at the same time, and determines that the radiation monitor fails in a case where the coincidence count signal is not obtained continuously for a predetermined number of times.

CITATION LIST

Patent Literature

PTL 1: JP 5336836 B1

SUMMARY OF INVENTION

Technical Problem

However, in the technique disclosed in PTL 1, in a case where it is determined "the radiation monitor fails", it is difficult to determine whether a defect is caused from the sensor unit or the light emission unit.

In addition, in the technique disclosed in PTL 1, the light emission unit is disposed to emit the light to the sensor unit (that is, near the sensor unit). Therefore, under an environment that a reactor container has a high dose rate or under a high temperature environment such as several hundred of degrees Celsius, a defect may be caused in the light emission unit. Therefore, there is room to further improve the reliability of the radiation monitor.

An object of the invention is to provide a radiation monitor with a high reliability.

Solution to Problem

To solve the above problem, the present invention provides a method of analyzing a radiation monitor including: emitting, from a light emission unit, light of a wavelength different from the light emission wavelength of a radiation detection element, the radiation detection element sensing radiation and light and emitting light of a predetermined light emission wavelength when receiving the radiation or the light; converting, by a control unit, the light incident through a wavelength selection unit which selectively passes the light of the light emission wavelength into an electric pulse; and determining whether at least the light emission unit is degraded on the basis of a count rate of the electric pulse and a light intensity of the light emission unit.

Advantageous Effects of Invention

According to the invention, it is possible to provide a radiation monitor with a high reliability.

BRIEF DESCRIPTION OF DRAWINGS

FIG. 13 is a diagram for describing an example of a change in the count rate and the light intensity of the radiation monitor according to the first embodiment of the invention.

FIG. 14 is a diagram for describing another example of a change in the count rate and the light intensity of the radiation monitor according to the first embodiment of the invention.

DESCRIPTION OF EMBODIMENTS

First Embodiment

<Configuration of Radiation Monitor>

Figure 1:
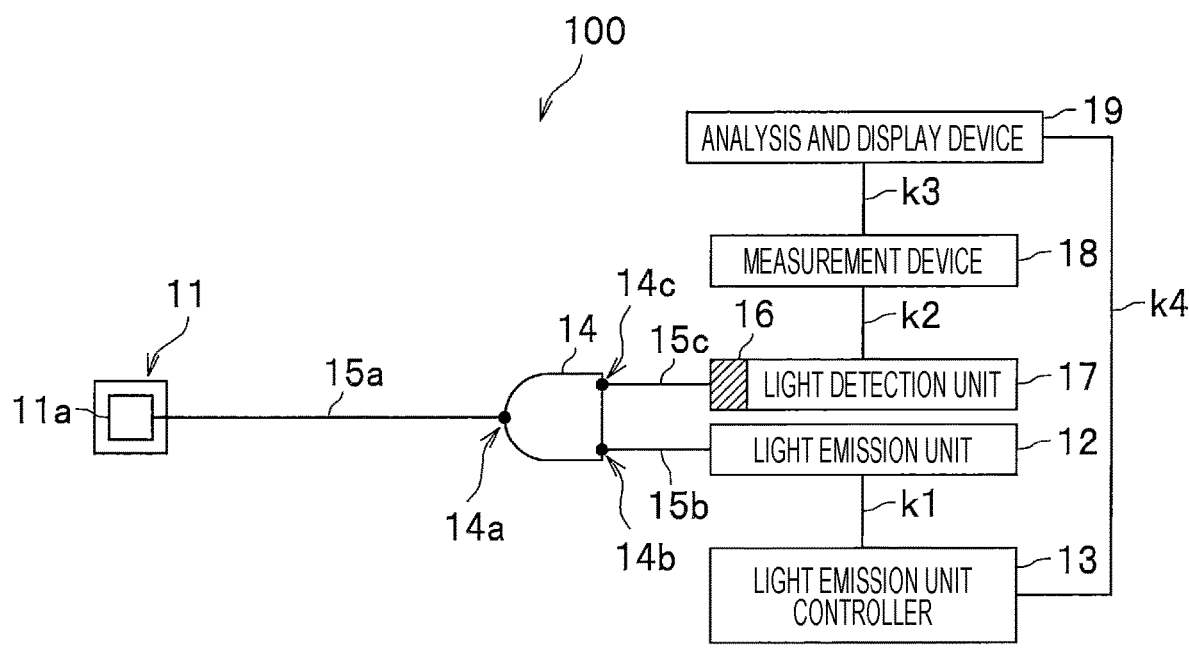
FIG. 1 is a diagram illustrating a configuration of a radiation monitor according to a first embodiment of the invention.

FIG. 1 is a diagram illustrating a configuration of a radiation monitor 100 according to a first embodiment.

The radiation monitor 100 is a device to detect radiation.

In addition, the radiation monitor 100 has also a function of determining whether its own state is good (that is, whether the radiation monitor 100 functions normally).

As illustrated in FIG. 1, the radiation monitor 100 includes a radiation detection unit 11, a light emission unit 12, a light emission unit controller 13 (control unit), an optical branching unit 14, and optical fibers 15a, 15b, and 15c (optical transmission line). In addition, the radiation monitor 100 includes a wavelength selection unit 16, a light detection unit 17, a measurement device 18 (control unit), and an analysis and display device 19 (control unit) besides the above configurations.

The radiation detection unit 11 is used to detect radiation and light which is incident on, and is disposed in a predetermined place of a nuclear power plant for example. As illustrated in FIG. 1, the radiation detection unit 11 includes a radiation detection element 11a. The radiation detection element 11a is an element which senses radiation and also light, and emits a light of a predetermined light emission wavelength when the radiation or the light is incident. As an example of the radiation detection element 11a, there is used a scintillation element which contains a rare earth element (neodymium, ytterbium, cerium, praseodymium, etc.) in yttrium aluminum garnet as a base material.

In this embodiment, the description will be given about a case where the radiation detection element 11a is Nd:YAG (neodymium-doped yttrium aluminum garnet). Nd:YAG has a property of producing photons of a light emission wavelength of about 1,064 nm when the radiation such as a γ-ray is incident, or the light from the light emission unit 12 is incident.

For example, when the radiation is incident on Nd:YAG which is the radiation detection element 11a, the energy level of the radiation detection element 11a is shifted to a predetermined excited state by the energy of the radiation. Then, when the energy level is shifted from the excited state to the ground state lower in the energy level, photons of a light emission wavelength of about 1,064 nm are generated in the radiation detection element 11a.

Further, the above configuration is also the same even in a case where the light from the light emission unit 12 is incident on the radiation detection element 11a, and the photons are generated in the radiation detection element 11a by the energy of the light. In this way, with the use of the radiation detection elements 11a of which the light emission wavelength is equal to or more than 800 nm, it is possible to suppress the degradation of the optical fiber 15a in accordance with the transmission of the light.

In addition, in a case where the radiation or the light is incident on Nd:YAG which is the radiation detection element 11a, the photons having a wavelength of about 1,064 nm are generated, and the photons having a wavelength different from 1,064 nm are also generated small in number. In other words, the "light emission wavelength" of the radiation detection element 11a means a wavelength at which a generation rate of photons is high compared to the other wavelengths.

In addition, while not illustrated in FIG. 1, the radiation detection unit 11 includes a housing which stores the radiation detection element 11a. The housing has a function of passing the radiation incident from the outside and of blocking the light incident from the outside.

The light emission unit 12 illustrated in FIG. 1 is a semiconductor laser which is used to determine whether the radiation monitor 100 functions normally. Further, an LED (Light Emitting Diode) may be used as the light emission unit 12. The light emission unit 12 is configured to emit light having a wavelength different from the light emission wavelength of the radiation detection element 11a.

Figure 2:
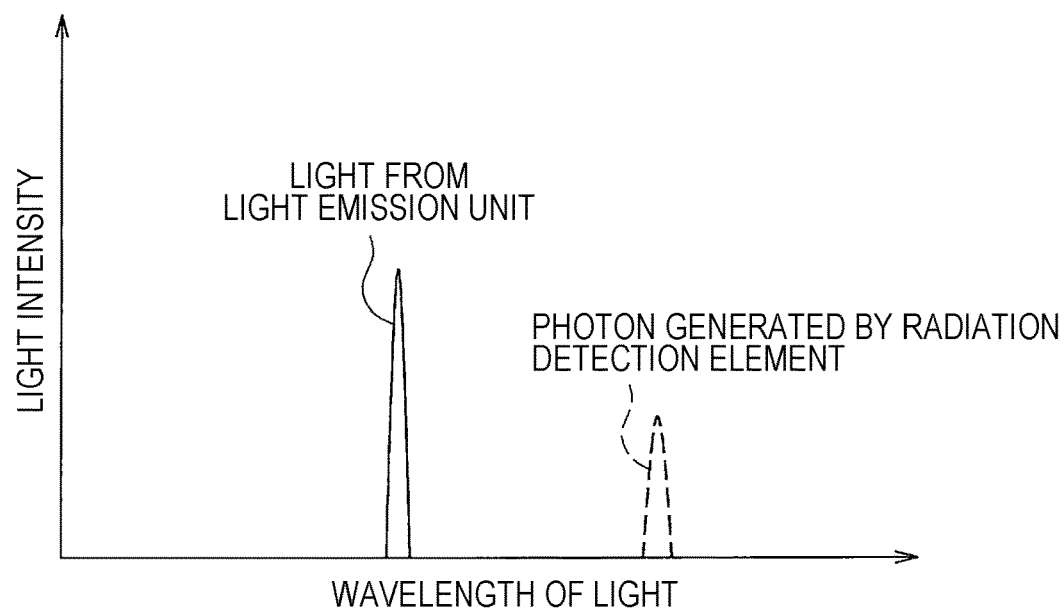
FIG. 2 is a diagram for describing a photon generated by a radiation detection element of the radiation monitor according to the first embodiment of the invention, and light from a light emission unit.

FIG. 2 is a diagram for describing the photons generated by the radiation detection element 11a and the light from the light emission unit 12. Further, the horizontal axis of FIG. 2 represents a wavelength of the light, and the vertical axis represents a light intensity.

In the example illustrated in FIG. 2, the wavelength of the light from the light emission unit 12 is shortened than the wavelength (that is, the light emission wavelength) of the photons generated by the radiation detection element 11a. With this configuration, the photons generated by the radiation detection element 11a and the light emitted from the light emission unit 12 can be distinguished in the wavelength selection unit 16 described below (one is passed, and the other is blocked).

Further, in a case where the radiation detection element 11a is Nd:YAG (light emission wavelength: 1064 nm), for example, the light emission unit 12 may emit the light having a wavelength of 445 nm. In addition, the light emission unit 12 may emit the light of a wavelength 520 nm, 650 nm, 780 nm, 808 nm, 905 nm, or 980 nm. Using any wavelength above, when the light of the wavelength is incident on the radiation detection element 11a, the photons of the light emission wavelength of about 1,064 nm are generated in the radiation detection element 11a as the excited state is shifted to the ground state.

In addition, this embodiment may be applied even to a case where the wavelength of the light of the light emission unit 12 is longer than the light emission wavelength of the radiation detection element 11a.

The light emission unit controller 13 illustrated in FIG. 1 is a device which controls the light emission unit 12, and is connected to the light emission unit 12 through a line k1.

The light emission unit controller 13 is configured to include electronic circuits such as a Central Processing Unit (CPU), a Read Only Memory (ROM), a Random Access Memory (RAM), and various types of interfaces. Then, a program stored in the ROM is read out and developed in the RAM, and the CPU performs various types of processes. Further, the process performed by the light emission unit controller 13 will be described later.

The optical branching unit 14 is used to branch the light from the radiation detection unit 11 toward the light emission unit 12 and the wavelength selection unit 16. In other words, the optical branching unit 14 has a function of guiding the light incident on a first port 14a through the optical fiber 15a to the optical fiber 15b through a second port 14b, and of guiding the light to the optical fiber 15c through a third port 14c.

As an example of the optical branching unit 14, an optical coupler may be used.

The light incident on the optical branching unit 14 from the radiation detection unit 11 through the optical fiber 15a is divided at a ratio of 1:1 and transmitted to the optical fibers 15b and 15c. Among them, the detection of the radiation and the maintenance of the radiation monitor 100 are performed on the basis of the light transmitted through the optical fiber 15c.

In addition, the optical branching unit 14 has a function of guiding the light incident from the light emission unit 12 through the optical fiber 15b to the radiation detection unit 11 through the optical fiber 15a.

The optical fiber 15a is an optical transmission line which guides the light incident from the light emission unit 12 through the optical branching unit 14 to the radiation detection unit 11, and guides the photons generated by the radiation detection unit 11 to the optical branching unit 14. In this way, when the light is bidirectionally transmitted through the optical fiber 15a, it is possible to reduce the cost compared to a case where the optical fibers are separately used. One end of the optical fiber 15a is inserted to a hole of the housing (not illustrated) which stores the radiation detection element 11a. The other end of the optical fiber 15a is connected to the first port 14a of the optical branching unit 14.

The optical fiber 15b is an optical transmission line which guides the light from the light emission unit 12 to the optical branching unit 14. One end of the optical fiber 15b is connected to the light emission unit 12, and the other end thereof is connected to the second port 14b of the optical branching unit 14.

The optical fiber 15c is an optical transmission line which guides the light incident from the radiation detection unit 11 through the optical branching unit 14 to the wavelength selection unit 16. One end of the optical fiber 15c is connected to the third port 14c of the optical branching unit 14, and the other end thereof is connected to the wavelength selection unit 16.

Further, the "optical transmission line" which transmits the light from the light emission unit 12 to the radiation detection unit 11, and transmits the light from the radiation detection unit 11 to the wavelength selection unit 16 is configured to include the optical fibers 15a, 15b, and 15c.

The wavelength selection unit 16 is configured to selectively pass the light of a wavelength within a predetermined range.

As the wavelength selection unit 16, a wavelength select filter may be used, or a spectrometer may be used.

The wavelength selection unit 16 is configured to be switchable from one of a "first mode" and a "second mode" to the other mode by the measurement device 18.

The "first mode" is a mode in which the light of the light emission wavelength of the radiation detection element 11a passes, but the light from the light emission unit 12 is blocked.

The "second mode" is a mode in which the light from the light emission unit 12 passes, but the light the light emission wavelength of the radiation detection element 11a is blocked.

For example, in the configuration that the wavelength selection unit 16 includes a plurality of wavelength select filters, the wavelength select filter corresponding to each mode is selected in an auto-change manner. In addition, in a case where the wavelength selection unit 16 is a spectrometer, the angle of the spectrometer is adjusted according to each mode.

The light detection unit 17 is a device which converts the light passing through the wavelength selection unit 16 into an electric pulse. More specifically, when one photon is incident on the light detection unit 17, one electric pulse is generated by the photoelectric conversion. As an example of the light detection unit 17, a photomultiplier tube or an avalanche photodiode may be used.

The inventors have experimentally found out that a dose rate of the radiation incident on the radiation detection element 11a and the number of photons generated in a unit of time by the radiation detection element 11a are proportional to each other. In this embodiment, the number (that is, the count rate) of electric pulses output in a unit of time from the light detection unit 17 to the measurement device 18 is converted to the dose rate of the radiation on the basis of the proportional relation.

In addition, the inventors have experimentally found out that the light intensity of the light incident on the radiation detection element 11a and the number of photons generated in a unit of time by the radiation detection element 11a are also proportional to each other. In this embodiment, a relation between the light intensity of the light emission unit 12 (that is, the light intensity of the light incident on the radiation detection element 11a) and the count rate of the electric pulse in the light detection unit 17 is specified.

The measurement device 18 is a device which measures the count rate of the electric pulse entered from the light detection unit 17, and is connected to the light detection unit 17 through a line k2. The measurement device 18 is configured to include, which not illustrated, a CPU, a ROM, a RAM, and electronic circuits such as various types of interface (not illustrated). The measurement device reads out a program stored in the ROM, and develops the program in the RAM and performs various types of processes.

The analysis and display device 19 has a function of determining whether at least the light emission unit 12 is degraded on the basis of the count rate and the light intensity of the light emission unit 12. The analysis and display device 19 is configured to include, while not illustrated, electronic circuits such as a CPU, a ROM, a RAM, and various types of interfaces. The analysis and display device reads out a program stored in the ROM and develops the program in the RAM, and the CPU performs various types of processes. As illustrated in FIG. 1, the analysis and display device 19 is connected to the measurement device 18 through a line k3, and connected to the light emission unit controller 13 through a line k4.

Figure 3:
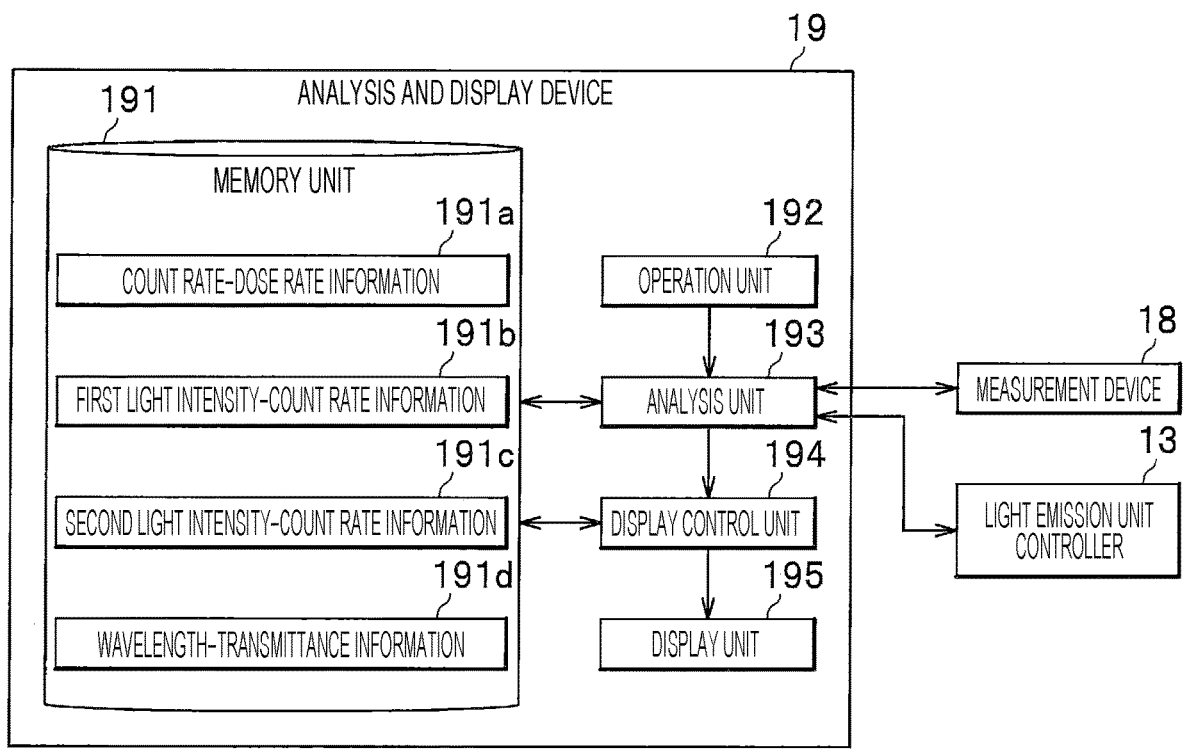
FIG. 3 is a functional block diagram of an analysis and display device of the radiation monitor according to the first embodiment of the invention.

FIG. 3 is a functional block diagram of the analysis and display device 19 which is included in the radiation monitor 100.

As illustrated in FIG. 3, the analysis and display device 19 includes a memory unit 191, an operation unit 192, an analysis unit 193, a display control unit 194, and a display unit 195.

In the memory unit 191, count rate-dose rate information 191a, first light intensity-count rate information 191b, second light intensity-count rate information 191c, and wavelength-transmittance information 191d are stored.

The count rate-dose rate information 191a is information indicating a relation between the count rate of the electric pulse input from the measurement device 18 (that is, the count rate of the photons) and the dose rate of the radiation.

Figure 4:
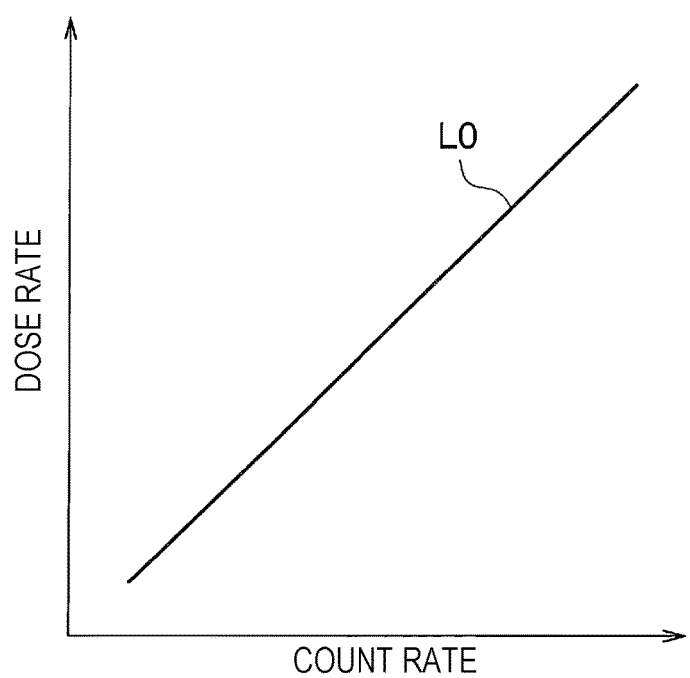
FIG. 4 is a diagram for describing count rate-dose rate information which is stored in a memory unit of the radiation monitor according to the first embodiment of the invention.

FIG. 4 is a diagram for describing the count rate-dose rate information 191a which is stored in the memory unit 191 in the radiation monitor 100.

The horizontal axis of FIG. 4 represents a count rate of the electric pulse which is input from the measurement device 18.

The vertical axis of FIG. 4 is a dose rate of the radiation which is incident on the radiation detection element 11a.

As illustrated in FIG. 4, the count rate and the dose rate are proportional to each other. A proportional coefficient of a straight line L0 indicating the proportional relation is stored in the memory unit 191 in advance as the count rate-dose rate information 191a (see FIG. 3).

Further, the first light intensity-count rate information 191b, the second light intensity-count rate information 191c, and the wavelength-transmittance information 191d illustrated in FIG. 3 will be described later.

The operation unit 192 illustrated in FIG. 3 is configured to confirm whether the radiation monitor 100 functions normally, and to take over a user's operation related to the operation of the radiation.

The analysis unit 193 has a function of calculating the dose rate of the radiation on the basis of the count rate input from the measurement device 18 and the count rate-dose rate information 191a. In addition, the analysis unit 193 has a function of determining whether the light emission unit 12 is degraded on the basis of the count rate input from the measurement device 18 and the light intensity of the light emission unit 12 which is input from the light emission unit controller 13. Further, the process of performing the analysis unit 193 will be described later.

The display control unit 194 has a function of controlling the display unit 195.

The display unit 195 is a display which displays an analysis result of the analysis unit 193.

Further, the light emission unit 12, the light emission unit controller 13, the wavelength selection unit 16, the light detection unit 17, the measurement device 18, and the analysis and display device 19 illustrated in FIG. 1 are disposed in a control room (not illustrated) of the nuclear power plant for example. The optical branching unit 14 illustrated in FIG. 1 is disposed near the control room. In addition, the radiation detection unit 11 is disposed in a predetermined place such as a reactor container vessel. Therefore, the optical fiber 15a connecting the radiation detection unit 11 and the optical branching unit 14 is as long as several hundred meters in many cases, and gradually degraded by the influence of the radiation.

<Process of Radiation Monitor>

(1. Measurement of Radiation)

When the radiation is measured, the measurement device 18 sets the wavelength selection unit 16 illustrated in FIG. 1 to a "first mode". In other words, the measurement device 18 sets the wavelength selection unit 16 such that the light of the light emission wavelength of the radiation detection element 11a passes, and the light from the light emission unit 12 is blocked.

When the radiation is incident from the outside to the radiation detection unit 11 (for example, γ-ray), the photons are generated by the radiation detection element 11a by the energy of the radiation. As described above, the number of photons generated in a unit of time is proportional to the dose rate of the radiation.

The photons generated by the radiation detection element 11a are incident on the optical fiber 15a and the optical branching unit 14. Then, the half of the photons is incident on the wavelength selection unit 16 through the optical fiber 15c, and pass through the wavelength selection unit 16.

The photons passed through the wavelength selection unit 16 are converted to the electric pulse corresponding to each photon in the light detection unit 17. The measurement device 18 measures the count rate of the electric pulse. The analysis and display device 19 converts the count rate into the dose rate on the basis of the count rate-dose rate information 191a, and displays the calculation result of the dose rate.

Further, except the maintenance and the operation check, the light emission unit 12 does not particularly emit the light.

(2. At Maintenance of Radiation Monitor)

The "maintenance" of the radiation monitor 100 is performed in a state where the dose rate of the radiation incident on the radiation detection element 11a is at a background level (BG level, natural radiation level). Such a "maintenance" is performed periodically in many cases in a state where the device (a generation source of radiation) surrounding the radiation monitor 100 is stopped. Further, the radiation at the "background level" is a weak radiation caused by cosmic rays and natural radioactive materials in the ground. Then, the maintenance of whether the radiation monitor 100 functions normally is started by a predetermined operation through the operation unit 192 (see FIG. 3).

Figure 5:
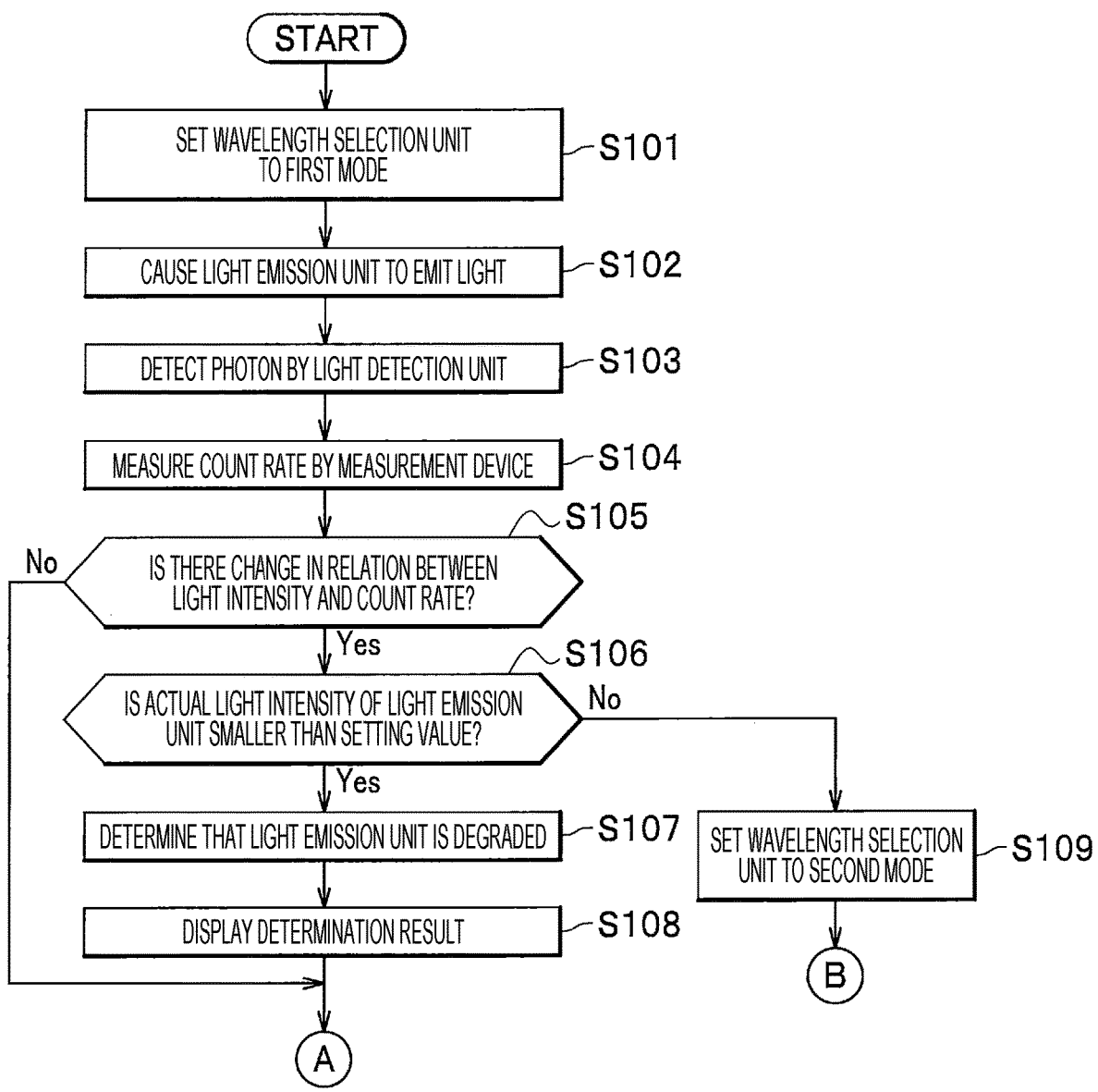
FIG. 5 is a flowchart illustrating a process when the radiation monitor according to the first embodiment of the invention is maintained.

FIG. 5 is a flowchart illustrating a process when the radiation monitor 100 is maintained (appropriately, see FIG. 1).

In step S101, the radiation monitor 100 sets the wavelength selection unit 16 to the first mode by the measurement device 18. In other words, the radiation monitor 100 sets the wavelength selection unit 16 such that the light emission wavelength of the radiation detection element 11a passes, and the light from the light emission unit 12 is blocked.

In step S102, the radiation monitor 100 causes the light emission unit 12 to emit light. In other words, the radiation monitor 100 causes the light emission unit 12 to emit light having a wavelength different from the light emission wavelength of the radiation detection element 11a on the basis of a setting value of a predetermined light intensity by the light emission unit controller 13. Further, with regard to the light intensity of the light emission unit 12, for example, the predetermined light intensity may be kept, and the light intensity may be changed in a stepped manner.

Figure 7:
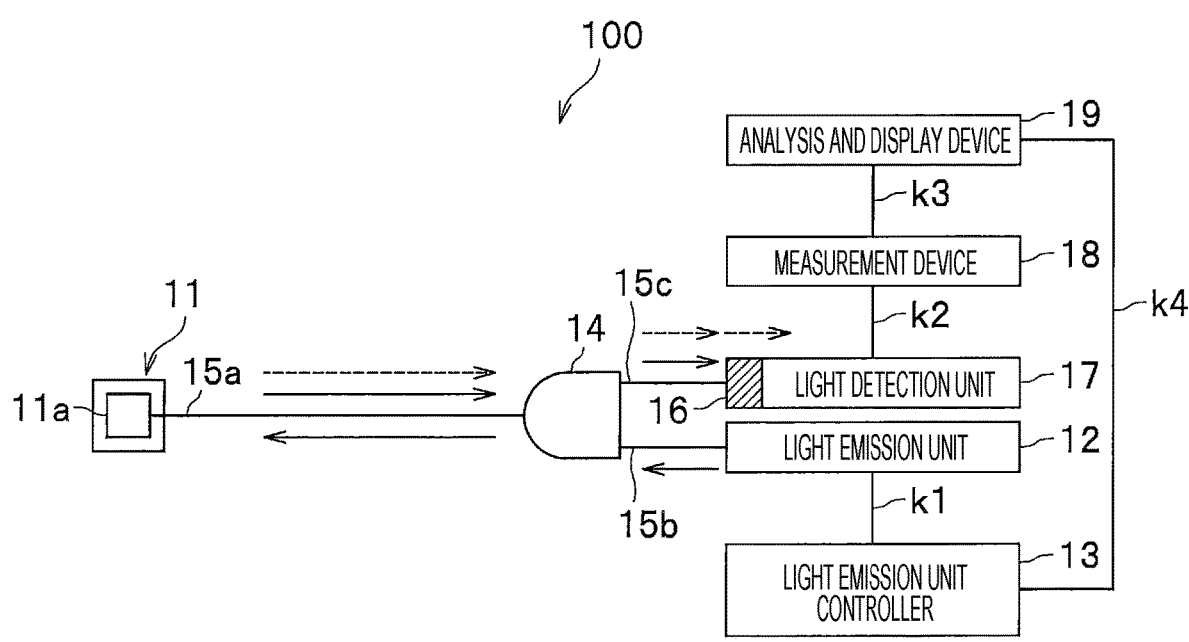
FIG. 7 is a diagram for describing a path of light when the radiation monitor according to the first embodiment of the invention is maintained.

FIG. 7 is a diagram for describing a path of light when the radiation monitor 100 is maintained.

Further, the solid arrow illustrated in FIG. 7 indicates a direction to transmit the light from the light emission unit 12. The broken arrow indicates a direction where the photons generated by the radiation detection element 11a are transmitted.

The light emitted from the light emission unit 12 is incident on the radiation detection element 11a through the optical fiber 15a. Depending on the energy of the light, the photons of the predetermined light emission wavelength (for example, 1,064 nm) are generated in the radiation detection element 11a at a generation rate which is proportional to the intensity of the emitted light. The photons are incident on the wavelength selection unit 16 through the optical fibers 15a and 15c, and passes through the wavelength selection unit 16 (broken arrow).

In addition, also the light which are transmitted from the light emission unit 12 and reflected/scattered in the radiation detection unit 11 is incident on the wavelength selection unit 16 through the optical fibers 15a and 15c (solid arrow). As described above, since the wavelength selection unit 16 is set to the "first mode", the light from the light emission unit 12 is blocked by the wavelength selection unit 16.

In step S103 of FIG. 5, the radiation monitor 100 detects the photons by the light detection unit 17. As described above, each photon incident on the light detection unit 17 is photoelectrically converted as each electric pulse.

In step S104, the radiation monitor 100 measures the count rate by the measurement device 18. In other words, the radiation monitor 100 counts the number of the electric pulses in a unit of time by the measurement device 18. This value is the count rate of the electric pulse, and the count rate of the photons passed through the wavelength selection unit 16. The count rate and the light intensity of the light emission unit 12 are proportional to each other.

Figure 8:
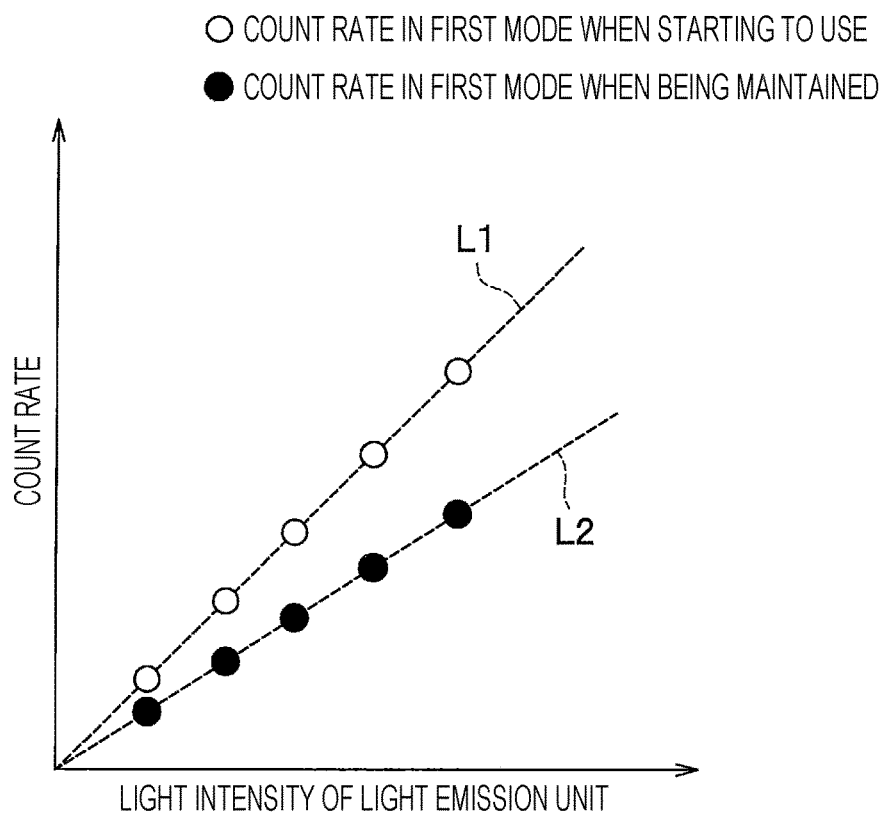
FIG. 8 is a diagram for describing a relation between a light intensity of the light emission unit of the radiation monitor according to the first embodiment of the invention and a count rate in a first mode.

FIG. 8 is a diagram for describing a relation between the light intensity of the light emission unit 12 and the count rate in the first mode.

The horizontal axis of FIG. 8 represents the light intensity of the light emission unit 12, and the vertical axis represents the count rate measured by the measurement device 18. A plurality of symbols "○" illustrated in FIG. 8 represents data obtained when it is already known the fact that the radiation monitor 100 functions normally in a state where the wavelength selection unit 16 is set to the first mode (when starting to use the radiation monitor 100). A proportional coefficient of a straight line L1 passing through these "○" is stored in the memory unit 191 in advance as the first light intensity-count rate information 191*b* (see FIG. 3) which indicates a relation between the light intensity of the light emission unit 12 and the count rate.

Further, when starting to use the radiation monitor 100, the light emission unit 12, the optical fibers 15*a*, 15*b*, and 15*c*, and the radiation detection element 11*a* are all new products, and thus there is no degradation in these components. Symbol "●" in a case where any one of these components is degraded will be described later (see FIG. 8).

In step S105 of FIG. 5, the radiation monitor 100 determines whether the relation between the light intensity and the count rate is changed using the analysis and display device 19.

In other words, in step S105, the analysis and display device 19 determines whether the count rate caused by the light emitted from the light emission unit 12 ("●" illustrated in FIG. 8) is lowered below the first light intensity-count rate information 191*b* ("○" illustrated in FIG. 8).

In the example illustrated in FIG. 8, a proportional coefficient of a straight line L2 passing through the plurality of symbols "●" becomes smaller than the reference straight L1. In other words, the count rate ("●") at the time of maintenance becomes lower than that at the time of starting to use at each light intensity. In such a case, in step S105 of FIG. 5, the analysis and display device 19 determines that the relation between the light intensity and the count rate is changed.

Further, degradation as causes of the change includes three types of degradation of the light emission unit 12, degradation of the optical fiber 15*a*, and degradation of the radiation detection element 11*a*. In this embodiment, the type of degradation is determined among the three types by the process of steps S106 to S118 (see FIGS. 5 and 6).

In step S105 of FIG. 5, in a case where the relation between the light intensity and the count rate is changed (S105: Yes), the process of the radiation monitor 100 proceeds to step S106.

In step S106, the radiation monitor 100 determines whether the actual light intensity of the light emission unit 12 is smaller than a predetermined setting value by the analysis and display device 19. For example, an inspector may connect a light intensity measurement device (not illustrated) to the light emission unit 12 to output a measurement value from the light intensity measurement device to the analysis and display device 19 (the actual light intensity of the light emission unit 12).

In step S106, in a case where the actual light intensity of the light emission unit 12 is smaller than the setting value (S106: Yes), the process of the radiation monitor 100 proceeds to step S107.

In step S107, the radiation monitor 100 determines that the light emission unit 12 is degraded using the analysis and display device 19. The reason is because the actual light intensity of the light emission unit 12 is lower than the setting value.

Figure 6:
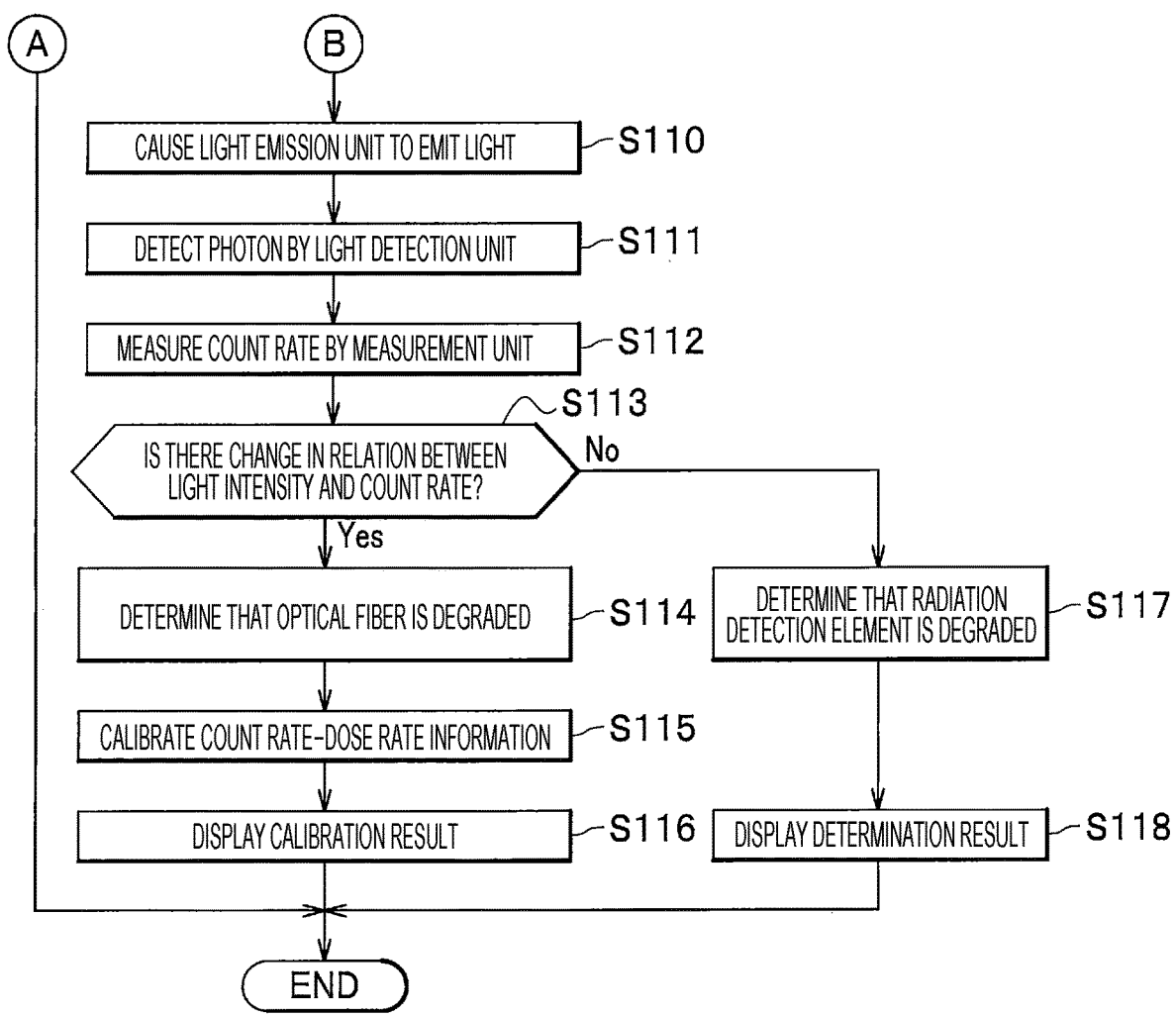
FIG. 6 is a flowchart illustrating a process when the radiation monitor according to the first embodiment of the invention is maintained.

In step S108, the radiation monitor 100 displays the fact that the light emission unit 12 is degraded to the analysis and display device 19, and ends the process ("END" of FIG. 6).

In this case, the light intensity of the light emission unit 12 is newly adjusted using the light emission unit controller 13, or the maintenance/replacement of the light emission unit 12 is performed.

In addition, in step S106, in a case where the actual light intensity of the light emission unit 12 is not smaller than the setting value (S106: No), the process of the radiation monitor 100 proceeds to step S109. In this case, there is a high possibility that at least one of the radiation detection element 11*a* and the optical fiber 15*a* is degraded.

In step S109, the radiation monitor 100 sets the wavelength selection unit 16 to the second mode by the measurement device 18. In other words, the radiation monitor 100 sets the wavelength selection unit 16 to pass the light from the light emission unit 12 and to block the light of the light emission wavelength of the radiation detection element 11*a*.

In step S110 of FIG. 6, the radiation monitor 100 makes the light emission unit 12 emit. The photons generated by the radiation detection element 11*a* caused by the light from the light emission unit 12 are incident on the wavelength selection unit 16 through the optical fibers 15*a* and 15*c*. The photons are blocked by the wavelength selection unit 16 which is set to the second mode. On the other hand, the light which is emitted from the light emission unit 12 and reflected/scattered in the radiation detection unit 11 is incident on the wavelength selection unit 16 through the optical fibers 15*a* and 15*c*, and passes through the wavelength selection unit 16.

In step S111, the radiation monitor 100 detects the photons by the light detection unit 17.

In step S112, the radiation monitor 100 measures the count rate by the measurement device 18. The count rate is proportional to the light intensity of the light emission unit 12 as described above.

Figure 9:
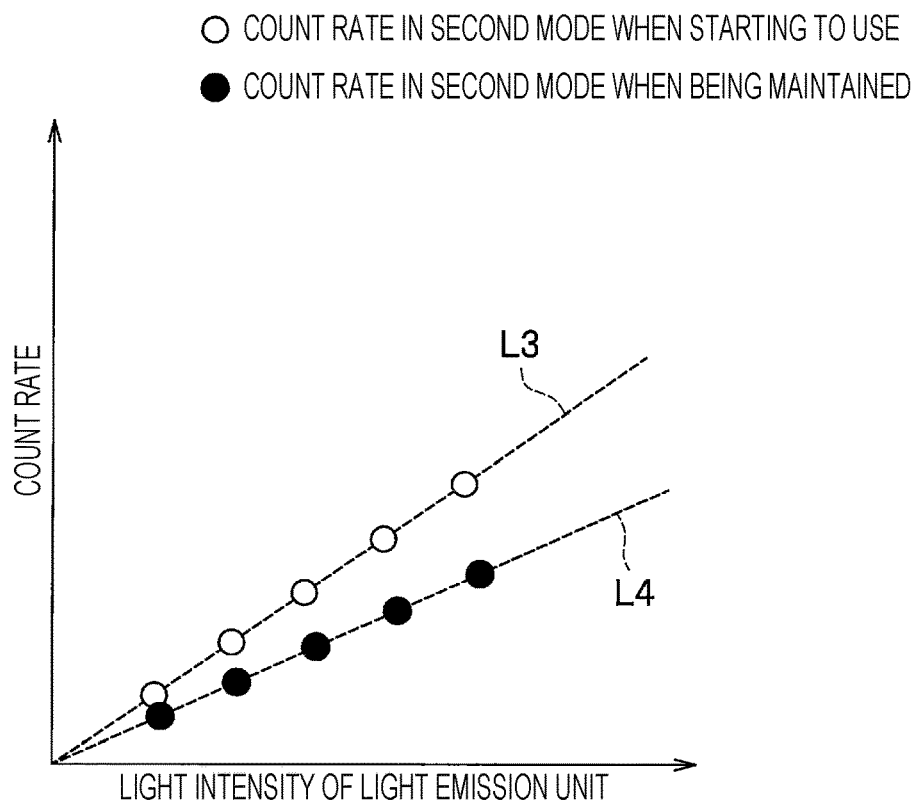
FIG. 9 is a diagram for describing a relation between the light intensity of the light emission unit of the radiation monitor according to the first embodiment of the invention and the count rate in a second mode.

FIG. 9 is a diagram for describing a relation between the light intensity of the light emission unit 12 of the radiation monitor 100 and the count rate in the second mode.

The horizontal axis of FIG. 9 represents the light intensity of the light emission unit 12, and the vertical axis represents the count rate measured by the measurement device 18.

Symbol "○" illustrated in FIG. 9 represents data obtained when it is already known the fact that the radiation monitor 100 functions normally in a state where the wavelength selection unit 16 is set to the second mode (when starting to use the radiation monitor 100). A proportional coefficient of a straight line L3 passing through these "○" is stored in the memory unit 191 as the second light intensity-count rate information 191*c* (see FIG. 3) which indicates the relation between the light intensity of the light emission unit 12 and the count rate. Further, a plurality of symbols "●" illustrated in FIG. 9 will be described later.

In step S113 of FIG. 6, the radiation monitor 100 determines whether the relation between the light intensity and the count rate is changed by the analysis and display device 19.

In other words, in step S113, the analysis and display device 19 determines whether the count rate caused by the light emitted from the light emission unit 12 ("●" illustrated in FIG. 9) is lowered below the second light intensity-count rate information 191c ("○" illustrated in FIG. 9).

In the example illustrated in FIG. 9, a proportional coefficient of a straight line L4 passing through the plurality of symbols "●" becomes smaller than the reference straight line L3.

In other words, the count rate ("●") at the time of maintenance becomes lower than that at the time of starting to use at each light intensity. In such a case, in step S113 of FIG. 6, the analysis and display device 19 determines that the relation between the light intensity and the count rate is changed (S113: Yes), and proceeds to the process of step S114.

In step S114, the radiation monitor 100 determines that the optical fiber 15a is degraded using the analysis and display device 19. When the optical fiber 15a is degraded by an influence of the radiation, the light is hard to be transmitted through the optical fiber 15a, and the count rate becomes lower than that at the normal time.

In step S115, the radiation monitor 100 calibrates the count rate-dose rate information 191a by the analysis and display device 19. The "calibration" will be described using FIG. 10.

Figure 10:
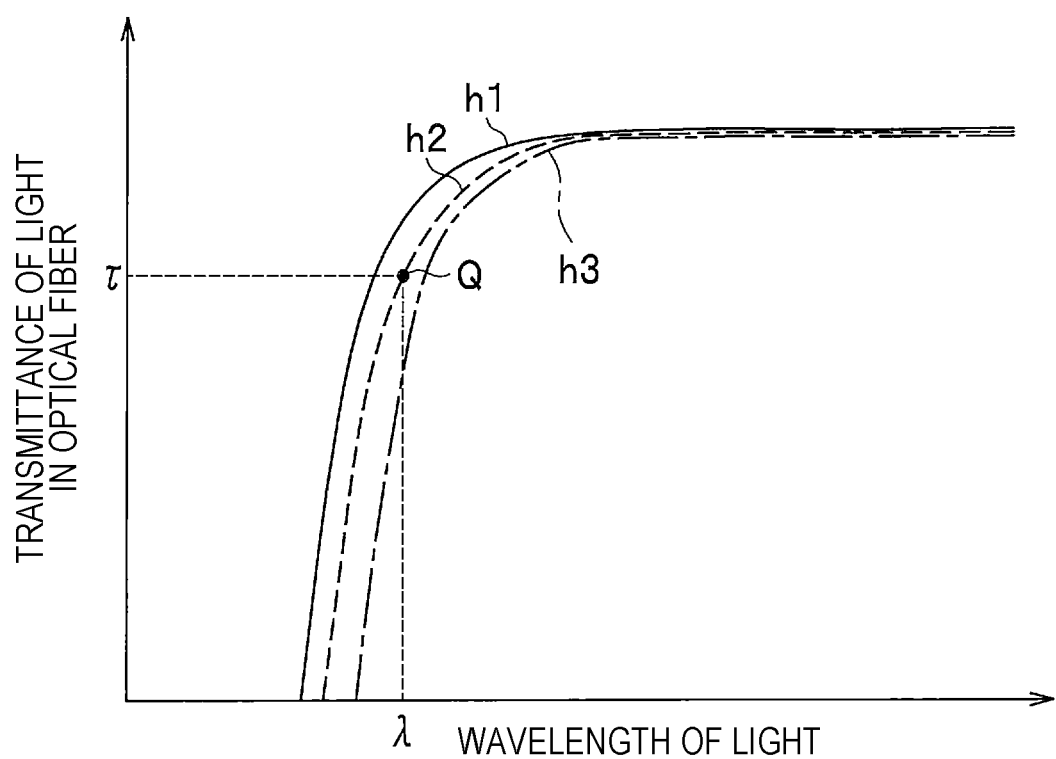
FIG. 10 is a diagram for describing wavelength-transmittance information which is stored in the memory unit of the radiation monitor of according to the first embodiment of the invention.

FIG. 10 is a diagram for describing the wavelength-transmittance information 191d which is stored in the memory unit 191 of the radiation monitor 100.

The horizontal axis of FIG. 10 represents the wavelength of the light which is transmitted through the optical fiber 15a.

The vertical axis of FIG. 10 represents the transmittance of the light in the optical fiber 15a.

As illustrated in FIG. 10, when the transmittance of the light is steeply increased from a certain wavelength and the wavelength of the light is further lengthened as the wavelength of the light transmitted to the optical fiber 15a is lengthened. The transmittance of the light is converged to a predetermined value.

In addition, the transmittance of the light of each wavelength becomes lowered in the state (curve h2) where the optical fiber 15a is degraded and the state (curve h3) where the optical fiber 15a is degraded further compared to the state (curve h1) where the optical fiber 15a is not degraded. In this way, the relation between the wavelength of the light in the optical fiber 15a and the transmittance is stored in the memory unit 191 in advance as the wavelength-transmittance information 191d (see FIG. 3) in association with a predetermined numerical value indicating a degree of the degradation of the optical fiber 15a.

The procedure of "calibration" of step S115 of FIG. 6 will be described specifically below. The analysis and display device 19 first reads the wavelength of the light of the light emission unit 12. The value of the wavelength is transmitted from the light emission unit controller 13 to the analysis and display device 19.

Next, the analysis and display device 19 calculates the transmittance of the light in the optical fiber 15a.

The transmittance is calculated on the basis of the light intensity of the light emission unit 12 and the count rate input from the measurement device 18. Then, the analysis and display device 19 calibrates the count rate-dose rate information 191a on the basis of the wavelength of the light of the light emission unit 12, the transmittance of the light in the optical fiber 15a, and the wavelength-transmittance information 191d.

In the example illustrated in FIG. 10, when the light of a wavelength $\lambda$ is emitted from the light emission unit 12, the light is transmitted through the optical fiber 15a at a transmittance $\tau$. Therefore, the analysis and display device 19 reads out a predetermined numerical value $\phi$ (a numerical value indicating a degree of degradation of the optical fiber 15a) associated with the curve h2 passing through point Q($\lambda$, $\tau$) from the memory unit 191 as the wavelength-transmittance information 191d (see FIG. 3).

Then, the analysis and display device 19 calculates a new proportional coefficient by multiplying the numerical value $\phi$ to the proportional coefficient of the straight line L0 illustrated in FIG. 4. The new proportional coefficient becomes a value larger than the proportional coefficient of the straight line L0 in a state where the optical fiber 15a is not degraded. Therefore, even if the optical fiber 15a is degraded, the dose rate of the radiation can be calculated with a high accuracy. Further, in a case where the degradation of the optical fiber 15a is apparent, the optical fiber 15a may be replaced.

In step S116 of FIG. 6, the radiation monitor 100 displays a calibration result of step S115 by the analysis and display device 19, and ends the process (END).

In addition, in step S113, in a case where there is no change in the relation between the light intensity and the count rate (S113: No), the process of the radiation monitor 100 proceeds to step S117.

In step S117, the radiation monitor 100 determines whether the radiation detection element 11a is degraded using the analysis and display device 19. If the light emission unit 12 and the optical fiber 15a are not degraded, there is a high possibility that the radiation detection element 11a is degraded which is the last one of the three causes described above.

In step S118, the radiation monitor 100 displays the determination result of step S117 by the analysis and display device 19, and ends the process (END).

In this case, the radiation detection element 11a is replaced with a new one.

(3. Confirming Operation of Radiation Monitor 100)

While the "maintenance" is performed during the nuclear power plant (not illustrated) is stopped, the "operation confirmation" of whether the radiation monitor 100 functions normally is performed during a period when the nuclear power plant is operating. In other words, the "operation confirmation" is performed in a state where the dose rate of the radiation incident on the radiation detection element 11a is higher than a so-called background level (BG level, natural radiation level).

Figure 11:
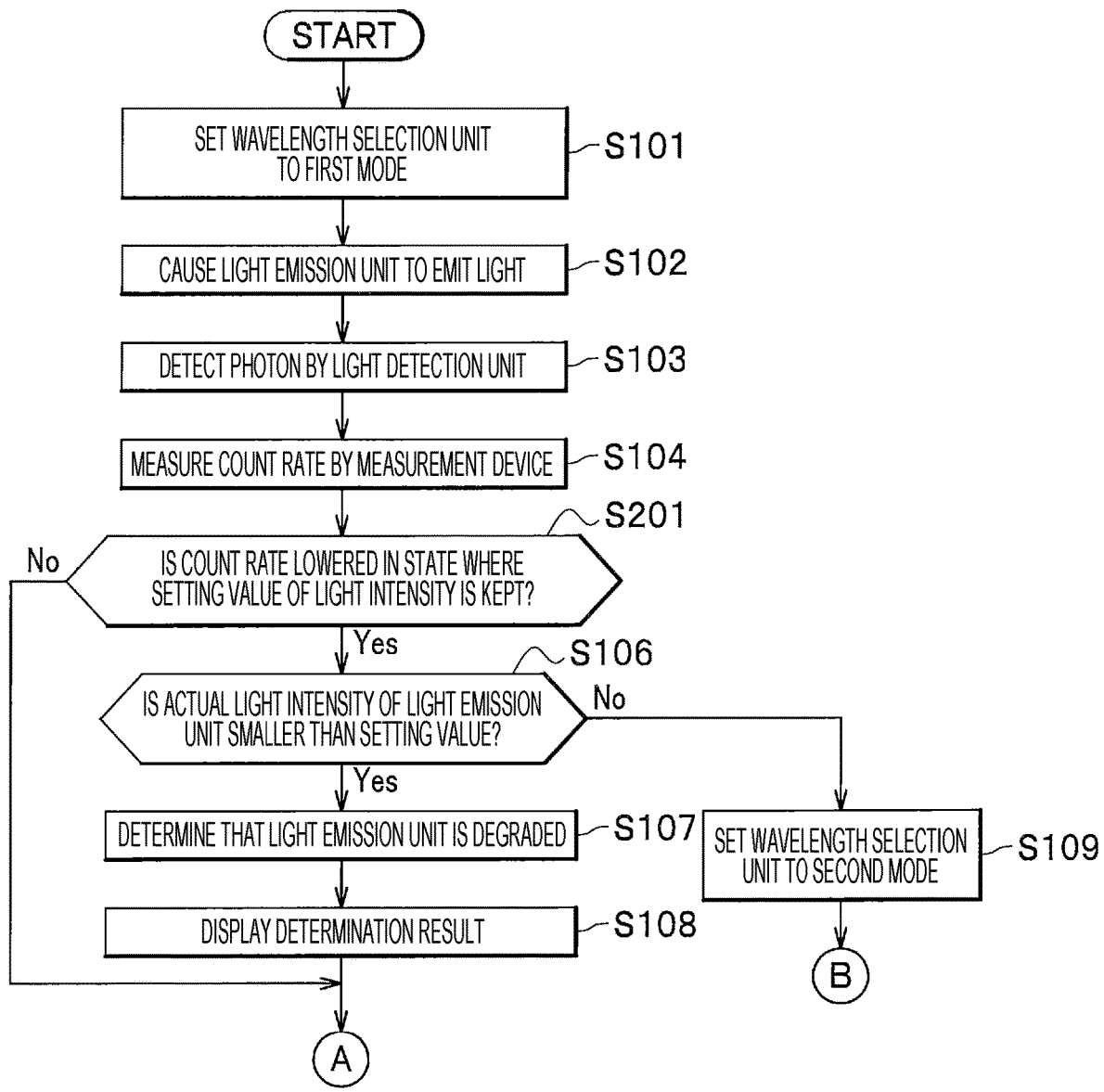
FIG. 11 is a flowchart illustrating a process when the operation of the radiation monitor according to the first embodiment of the invention is confirmed.

FIG. 11 is a flowchart illustrating a process when confirming the operation of the radiation monitor 100 (appropriately see FIG. 1).

Further, the same process as the flowchart at the time of maintenance of the radiation monitor 100 (see FIGS. 5 and 6) will be attached with the same step number.

In step S101, the radiation monitor 100 sets the wavelength selection unit 16 to the first mode, and sequentially performs the emission of the light emission unit 12 (S102), the detection of the photon (S103), and the measurement of the count rate (S104).

FIG. 13(a) is a diagram for describing an example of the change in the count rate of the radiation monitor 100.

The horizontal axis of FIG. 13(a) represents time, and the vertical axis represents the count rate in a state where the wavelength selection unit 16 is set to the first mode.

A count rate nL illustrated in FIG. 13(a) is a measurement lower limit in a predetermined specification of the radiation monitor 100. In other words, the radiation monitor 100 can measure the count rate with a high accuracy if the count rate falls within a predetermined range equal to or more than the measurement lower limit. Further, even if the count rate is less than the measurement lower limit, the count rate is slightly degraded from the accuracy of the specification. However, the count rate can be measured.

Symbol "○" illustrated in FIG. 13(a) represents the count rate in a state where the wavelength selection unit 16 is set to the first mode before the nuclear power plant start to operate.

At time t1 before the operation starts, a weak natural radiation is incident on the radiation detection element 11a. Therefore, the count rate becomes a count rate n0 of the background level (BG level).

Thereafter, the nuclear power plant starts to operate at time t2.

Symbol "●" illustrated in FIG. 13(a) represents a count rate when the light emission unit 12 emits light in a state where the nuclear power plant operates and the wavelength selection unit 16 is set to the first mode. Further, the reduction of the count rate at time t3 will be described later.

FIG. 13(b) is a diagram for describing an example of the change in the light intensity of the light emission unit 12.

In the example illustrated in FIG. 13(b), the light emission unit 12 emits light at a certain light intensity p after time t2. In addition, the light intensity p is set such that a count rate n1 is converged between the background level (the count rate n0: see FIG. 13(a)) and the measurement lower limit (the count rate nL: see FIG. 13(a)). With this configuration, while a weak radiation near the count rate nL (measurement lower limit) is detected, the photons caused from the emission of the light emission unit 12 can also be detected.

In this way, when the light emission unit 12 emits, the radiation accompanying the operation of the nuclear power plant is incident on the radiation detection element 11a, and also incident on the light from the light emission unit 12. The photons generated by the radiation detection element 11a caused from the energy of these radiation and light pass through the wavelength selection unit 16 which is set to the first mode, and are incident on the light detection unit 17 (see FIG. 7).

FIGS. 14(a) and 14(b) are diagrams for describing another example of the change in the count rate and the light intensity of the radiation monitor 100.

In this way, the count rate may be changed in a stepped manner (see FIG. 14(a)) by changing the light intensity of the light emission unit 12 in a stepped manner (see FIG. 14(b)). Then, the soundness of the radiation monitor 100 may be confirmed on the basis of the change of the count rate accompanying the change in the light intensity of the light emission unit 12.

Returning to FIG. 11, the description will be continued.

In step S201, the radiation monitor 100 determines whether the count rate is lowered in a state where the setting value of the light intensity of the light emission unit 12 is kept using the analysis and display device 19. More spe-cifically, the radiation monitor 100 determines whether a reduction amount of the count rate is equal to or more than a predetermined threshold, and determines whether the count rate is lowered down to the background level. In a case where at least one of the above two conditions is satisfied, the analysis and display device 19 determines that the count rate is lowered in step S201.

In the example illustrated in FIGS. 13(a) and 13(b), the count rate is lowered down to a value n0 (background level) at time t3 although the light emission unit 12 is kept at the light intensity p after time t2. In such a case, the analysis and display device 19 determines "the count rate is lowered" in step S201.

In addition, in the example illustrated in FIGS. 14(a) and 14(b), the count rate is changed in a stepped manner, but the count rate becomes constant when the light intensity of the light emission unit 12 is constant. In such a case, the analysis and display device 19 determines "the count rate is not lowered" in step S201.

Figure 12:
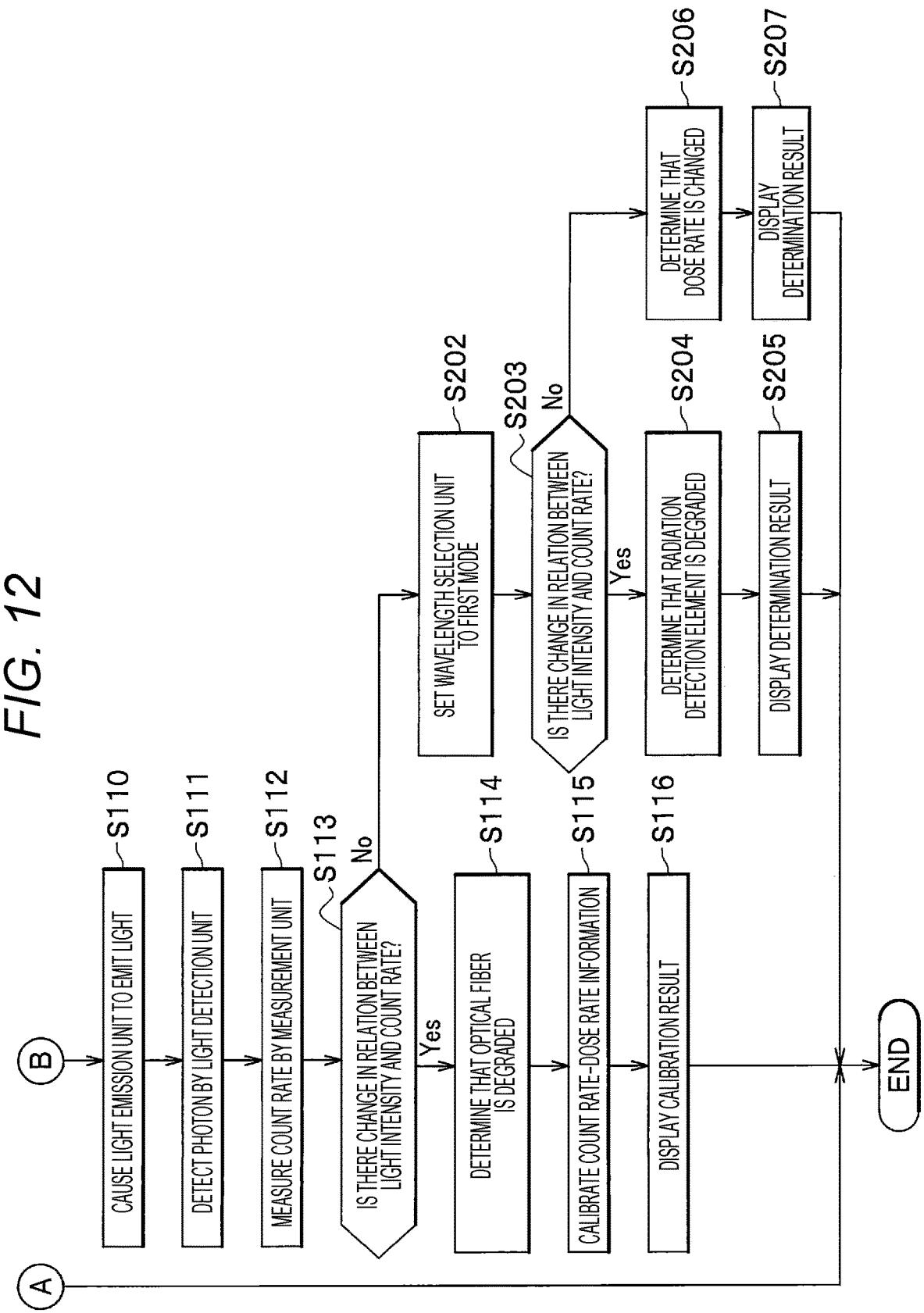
FIG. 12 is a flowchart illustrating a process when the operation of the radiation monitor according to the first embodiment of the invention is confirmed.

As described above, in a case where the count rate is not lowered in step S201 (S201: No), the radiation monitor 100 ends the process ("END" of FIG. 12). The reason is because there is a high possibility that the radiation detection element 11a, the light emission unit 12, and the optical fiber 15a are not degraded.

On the other hand, in a case where the count rate is lowered in step S201 (S201: Yes), the process of the radiation monitor 100 proceeds to step S106.

In step S106, the radiation monitor 100 determines whether the actual light intensity of the light emission unit 12 is smaller than a predetermined setting value. In a case where the actual light intensity of the light emission unit 12 is smaller than the setting value (S106: Yes), the radiation monitor 100 determines that the light emission unit 12 is degraded (S107), and displays the determination result (S108).

On the other hand, in a case where the light intensity of the light emission unit 12 is not smaller than the setting value in step S106 (S106: No), the radiation monitor 100 sets the wavelength selection unit 16 to the second mode in step S109.

As described above, the second mode is a mode in which the light from the light emission unit 12 is passed through, and the light of the light emission wavelength of the radiation detection element 11a is blocked.

After the process of step S109, the radiation monitor 100 causes the light emission unit 12 to emit light (S110: see FIG. 12), detects the photons by the light detection unit 17 (S111), and measures the count rate by the measurement device 18 (S112).

Next, in step S113, the radiation monitor 100 determines whether the relation between the light intensity and the count rate is changed. In other words, in step S113, the analysis and display device 19 determines whether the count rate caused by the light emitted from the light emission unit 12 is lowered below the second light intensity-count rate information 191c.

In step S113, in a case where the relation between the light intensity and the count rate is changed (S113: Yes), the radiation monitor 100 determines that the optical fiber 15a is degraded (S114). Then, the radiation monitor 100 calibrates the count rate-dose rate information 191a (S115), and displays the calibration result (S116).

Further, the calibration procedure of the count rate-dose rate information 191a is the same as that at the time of maintaining the radiation monitor 100.

On the other hand, in step S113, in a case where there is no change in the relation between the light intensity and the count rate (S113: No), the process of the radiation monitor 100 proceeds to step S202.

In step S202, the radiation monitor 100 sets the wavelength selection unit 16 to the first mode. In other words, the radiation monitor 100 sets the wavelength selection unit 16 such that the light emission wavelength of the radiation detection element 11a passes, and the light from the light emission unit 12 is blocked.

In step S203, the radiation monitor 100 determines whether the relation between the light intensity and the count rate is changed. In other words, the radiation monitor 100 determines whether the count rate caused by the light emitted from the light emission unit 12 is lowered below the first light intensity-count rate information 191b. In a case where the relation between the light intensity and the count rate is changed (S203: Yes), the process of the radiation monitor 100 proceeds to step S204.

In step S204, the radiation monitor 100 determines that the radiation detection element 11a is degraded.

The reason is because the count rate becomes lower even to that at the normal time although the optical fiber 15a is not degraded. In this case, the radiation detection element 11a is replaced with a new one.

In step S205, the radiation monitor 100 displays the determination result of step S204 by the analysis and display device 19.

On the other hand, in a case where there is no change in the relation between the light intensity and the count rate in step S203 (S203: No), the process of the radiation monitor 100 proceeds to step S206. In this case, there is a high possibility that the light emission unit 12, the radiation detection element 11a, and the optical fiber 15a are not degraded. Therefore, the radiation monitor 100 determines that the dose rate of the radiation incident on the radiation detection element 11a is changed in step S206.

In step S207, the radiation monitor 100 displays the determination result of step S206 by the analysis and display device 19.

After the processes of step S116, S205, or S207, the radiation monitor 100 ends a series of processes (END).

<Effects>

According to the first embodiment, the light emission unit 12 can emit light at a wavelength different from the light emission wavelength of the radiation detection element 11a during the maintenance and the operation confirmation of the radiation monitor 100. With this configuration, one of the photons generated by the radiation detection element 11a and the light from the light emission unit 12 can be selectively passed by the wavelength selection unit 16. Then, a place where an error occurs in the radiation monitor 100 can be specified by appropriately switching the setting (the first mode and the second mode) of the wavelength selection unit 16. In other words, it is possible to simply specify whether any one of the light emission unit 12, the optical fiber 15a, and the radiation detection element 11a is degraded.

In addition, the maintenance and the operation confirmation are performed by the analysis and display device 19 of the radiation monitor 100. Therefore, there is no need for an inspector to perform the inspection near the radiation detection unit 11, or to perform the inspection by taking out the radiation monitor 100. With this configuration, for example, the maintenance and the operation confirmation of the radiation monitor 100 can be easily performed even in a severe environment at a high dose rate.

In addition, in a case where it is determined that the optical fiber 15a is degraded (S114), the count rate-dose rate information 191a is calibrated (S115). With this configuration, the radiation can be detected with a high accuracy without replacing the optical fiber 15a even when the optical fiber 15a is degraded by the radiation.

In addition, there is no need to apply a high voltage to the radiation detection unit 11 unlike the related art where an ionization chamber or a semiconductor detector is used.

Therefore, there is no concern that hydrogen explosion occurs even under a hydrogen/oxygen environment, and no electric noises occur. In this way, according to the first embodiment, it is possible to provide the radiation monitor 100 with a high reliability.

Second Embodiment

A radiation monitor 100A according to a second embodiment (see FIG. 15) is different from the first embodiment in that attenuation filters 21 and 22 (see FIG. 15) are further included. Further, the other configurations are similar to those of the first embodiment.

Therefore, the different portions from the first embodiment will be described, and the redundant portions will be omitted.

Figure 15:
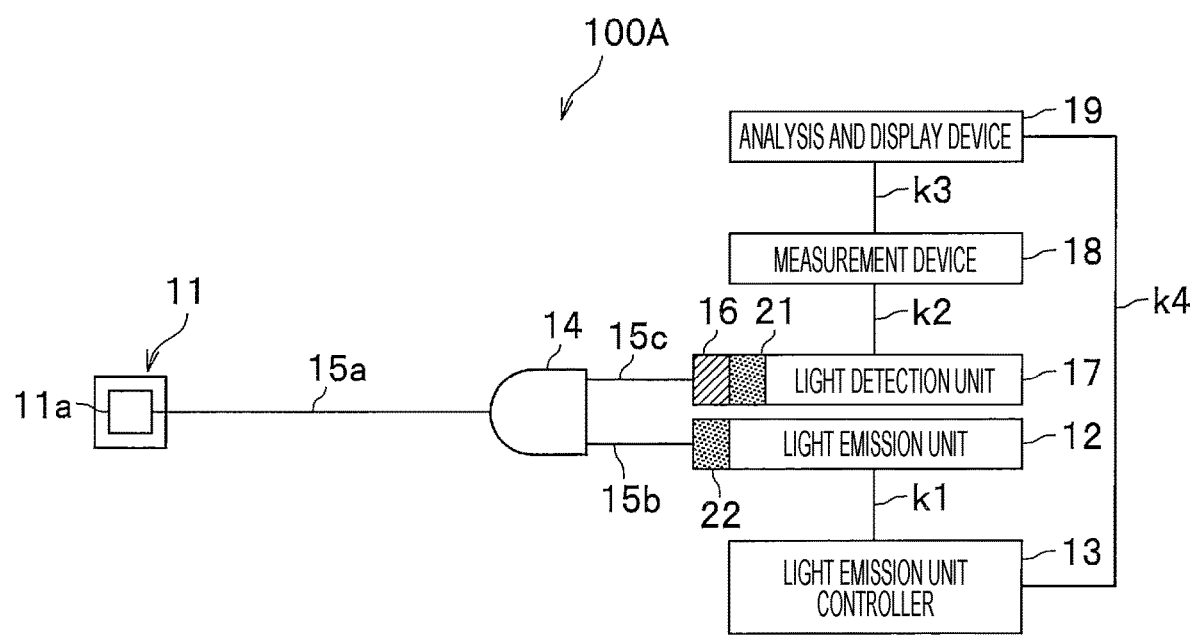
FIG. 15 is a diagram illustrating a configuration of a radiation monitor according to a second embodiment of the invention.

FIG. 15 is a diagram illustrating the configuration of the radiation monitor 100A according to the second embodiment.

The attenuation filter 21 illustrated in FIG. 15 is a filter which attenuates the light passing through the wavelength selection unit 16, and interposed between the wavelength selection unit 16 and the light detection unit 17. With the attenuation filter 21, in a case where the count rate of the photons passing through the wavelength selection unit 16 exceeds an upper limit of the conversion of the light detection unit 17, the count rate of these photons can be appropriately calculated.

For example, in a case where four ND filters (Neutral Density Filter) are overlapped as the attenuation filter 21 to attenuate the light intensity to 1/10th, the light passing through the wavelength selection unit 16 is attenuated to 1/10,000th in the attenuation filter 21. Therefore, the measurement device 18 sets a value obtained by multiplying the count rate of the light passing through the attenuation filter 21 by 10,000 times as the count rate of the light passing through the wavelength selection unit 16.

The attenuation filter 22 illustrated in FIG. 15 is a filter which attenuates the light from the light emission unit 12, and is provided in the light emission unit 12. For example, in a case where it is assumed that the light intensity of the light emission unit 12 is changed in a wide range, it is desirable to provide the attenuation filter 22. With this configuration, for example, even if the light intensity is changed in a wide range of 7 digits in the light emission unit 12, the count rate of the photons passing through the wavelength selection unit 16 can be accurately calculated on the basis of the attenuation rates of the attenuation filters 21 and 22.

Further, the processes of the maintenance and the operation confirmation of the radiation monitor 100A are similar to those of the first embodiment, and the description thereof will be omitted.

<Effects>

According to the second embodiment, since the radiation monitor 100A is provided with the attenuation filters 21 and 22, even the radiation of an extremely high dose rate can be detected with a high accuracy. In addition, even in a case where the wavelength selection unit 16 is set to any one of the first mode and the second mode, the light intensity of the light emission unit 12 can be adjusted within a wide range by the light emission unit controller 13. The analysis and display device 19 can accurately calculate the count rate on the basis of the light intensity.

Third Embodiment

A third embodiment is different from the first embodiment in that a radiation monitor 100B (see FIG. 16) includes n radiation detection elements 111a to 11na (see FIG. 16) which have different light emission wavelengths. In addition, the third embodiment is different from the first embodiment in that the light emission wavelength of one of the radiation detection elements 111a to 11na selectively passes through the wavelength selection unit 16. Further, the other configurations are similar to those of the first embodiment. Therefore, the different portions from the first embodiment will be described, and the redundant portions will be omitted.

Figure 16:
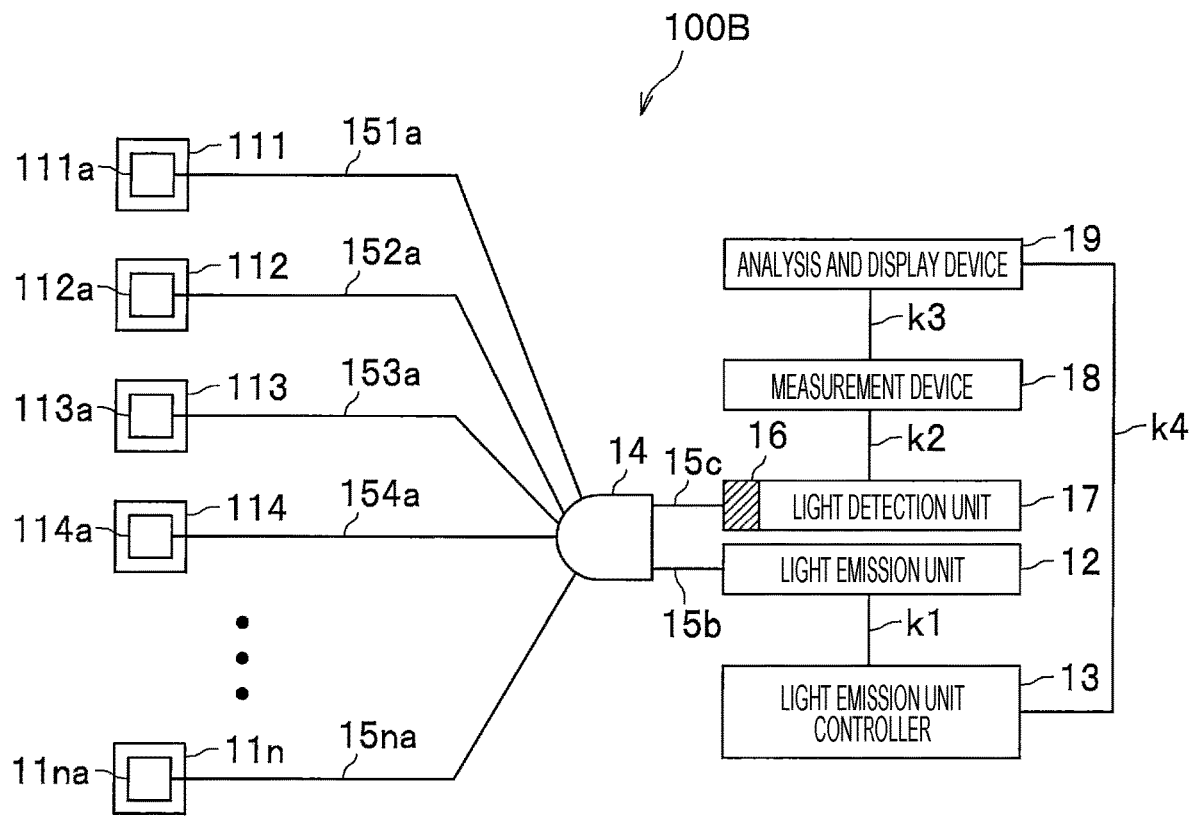
FIG. 16 is a diagram illustrating a configuration of a radiation monitor according to a third embodiment of the invention.

FIG. 16 is a diagram illustrating a configuration of the radiation monitor 100B according to the third embodiment.

As illustrated in FIG. 16, the radiation monitor 100B includes n radiation detection units 111 to 11n. The radiation detection unit 111 is connected to the optical branching unit 14 through an optical fiber 151a. Similarly, another radiation detection unit 112 is also connected to the optical branching unit 14 through an optical fiber 152a.

In addition, the radiation detection unit 111 includes the radiation detection element 111a. Similarly, the other radiation detection unit 112 also includes a radiation detection unit 112a. The light emission wavelengths of these radiation detection elements 111a to 11na will be described using FIG. 17.

Figure 17:
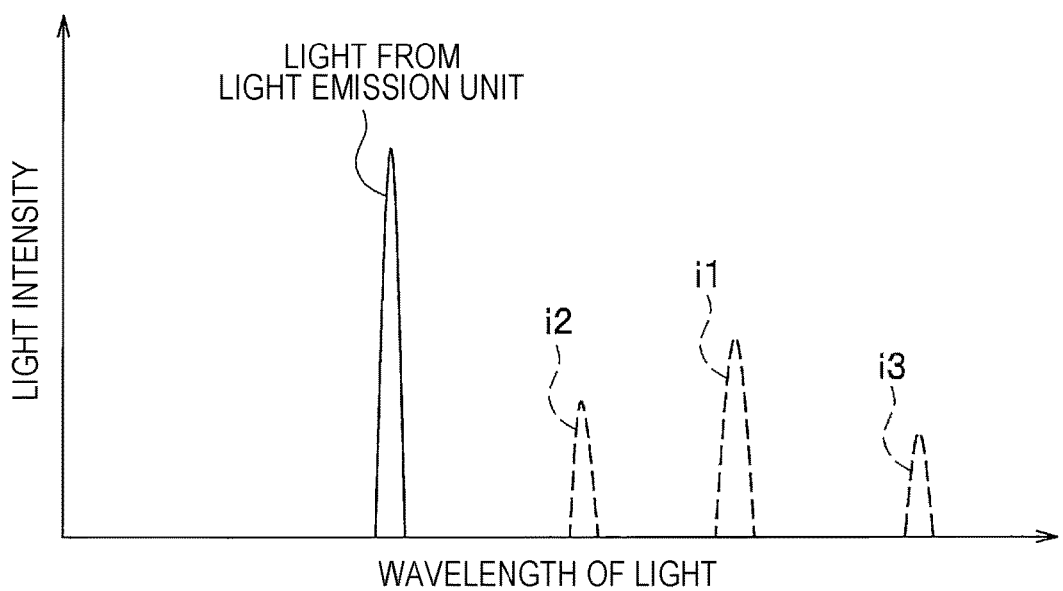
FIG. 17 is a diagram for describing photons generated by a plurality of radiation detection elements in the radiation monitor according to the third embodiment of the invention and the light from the light emission unit.

FIG. 17 is a diagram for describing the photons generated by a plurality of radiation detection elements in the radiation monitor 100B and the light from the light emission unit 12.

The horizontal axis of FIG. 17 represents the wavelength of the light, and the vertical axis represents the light intensity. A curve i1 illustrated in FIG. 17 indicates the characteristic of the photons generated by the radiation detection element 111a (see FIG. 16). Similarly, curves i2 and i3 indicate the characteristics of the photons generated by the radiation detection elements 112a and 113a (see FIG. 16). Further, in FIG. 17, the other radiation detection elements 114a to 11na (see FIG. 16) are omitted in the drawing.

As illustrated in FIG. 17, the wavelength of the light from the light emission unit 12 and the light emission wavelength of the radiation detection element 111a are different. In addition, in FIG. 17, while described the characteristics of the radiation detection elements 111a to 113a, the radiation detection elements 111a to 11na are different from each other in the light emission wavelength. In other words, the wavelengths of the generated photons become different by irradiating the radiation detection elements 111a to 11na with the radiation or the light.

The wavelength selection unit 16 illustrated in FIG. 16 has a function of passing through the light of the light emission wavelength of the radiation detection element selected by the measurement device 18 among the radiation detection elements 111a to 11na in the first mode, and of blocking the light of other wavelengths. Then, the target radiation detection elements are sequentially switched by the measurement device 18 to switch the wavelengths of the light passing through the wavelength selection unit 16.

Further, the information related to the light emission wavelengths of the radiation detection elements 111a to 11na is stored in the measurement device 18 in advance in association with identification information of the radiation detection elements 111a to 11na.

The analysis and display device 19 calculates the dose rate of the radiation on the basis of the count rate of the photons from the radiation detection element selected by the measurement device 18. With this configuration, the dose rates of the radiation incident on the radiation detection elements 111a to 11na can be individually calculated.

In addition, the analysis and display device 19 determines whether the radiation detection element selected by the measurement device 18 and the optical fiber connected to the radiation detection element are degraded. With this configuration, it is possible to individually determine whether the radiation detection elements 111a to 11na and the optical fibers 151a to 15na are degraded.

Further, the processes related to the maintenance and the operation confirmation of the radiation monitor 100B are similar to those of the first embodiment, and the description thereof will be omitted.

<Effects>

According to the third embodiment, the analysis and display device 19 calculates the count rate of the photons from the radiation detection element selected by the measurement device 18 among the radiation detection elements 111a to 11na having different light emission wavelengths. With this configuration, the dose rate can be measured at plural positions in the nuclear power plant. In addition, it is possible to determine whether the radiation detection elements 111a to 11na and the optical fibers 151a to 15na are degraded.

In addition, even in the configuration where the plurality of radiation detection units 111 to 11n is provided, one light emission unit 12 is enough. Therefore, it is possible to reduce the cost required for the light emission unit 12 compared to the configuration where a plurality of the light emission units 12 is provided.

Fourth Embodiment

A fourth embodiment is different from the first embodiment in that a radiation monitor 10C (see FIG. 18) includes n radiation detection units 111 to 11n. In addition, the fourth embodiment is different from the first embodiment in that there are provided an optical switch 23 connected to the radiation detection units 111 to 11n and an optical switch controller 24 (control unit) to control the optical switch 23.

Further, the other configurations are similar to those of the first embodiment. Therefore, the different portions from the first embodiment will be described, and the redundant portions will be omitted.

Figure 18:
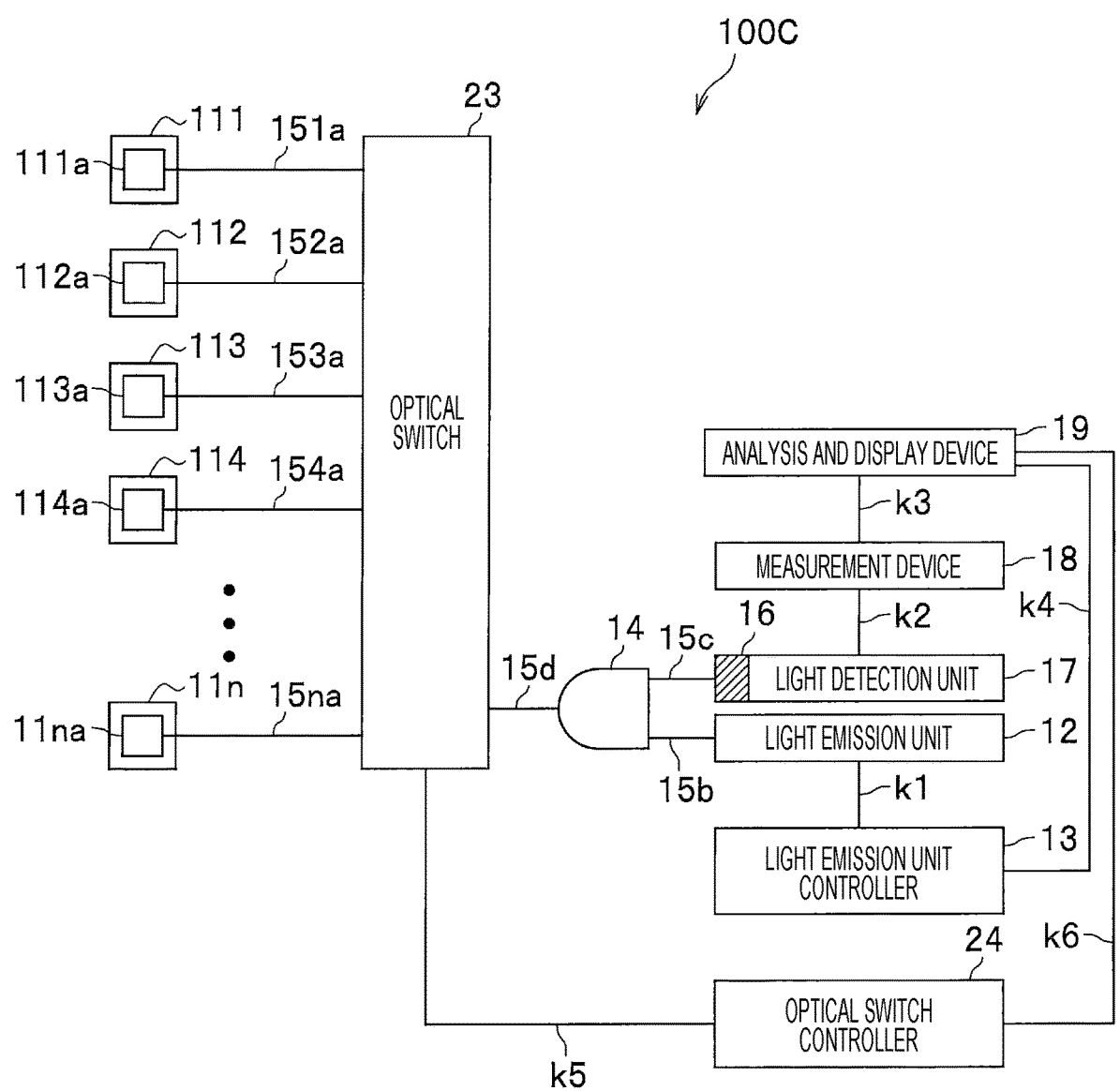
FIG. 18 is a diagram illustrating a configuration of a radiation monitor according to a fourth embodiment of the invention.

FIG. 18 is a diagram illustrating a configuration of a radiation monitor 100C according to the fourth embodiment.

As illustrated in FIG. 18, the radiation monitor 100C includes the radiation detection units 111 to 11n, the optical fibers 151a to 15na, the optical switch 23, and the optical switch controller 24. In addition, the radiation monitor 100C includes the configurations such as the light emission unit 12 described in the first embodiment.

The optical switch 23 has a function of guiding the light from the light emission unit 12 selected by the optical switch controller 24 among the plurality of the radiation detection units 111 to 11n, and of guiding the light from the radiation detection unit to the wavelength selection unit 16.

With the optical switch 23, for example, MEMS (Micro Electro Mechanical Systems) can be used to switch the optical path using an electrostatic force.

In addition, a mechanic optical switch or an optical waveguiding switch which is well known in the related art may be used as the optical switch 23.

As illustrated in FIG. 18, the optical switch 23 is connected to the radiation detection unit 111 through the optical fiber 151a, and connected to the optical branching unit 14 through the optical fiber 15d.

The optical switch controller 24 is a device which controls the optical switch 23. The optical switch controller is connected to the optical switch 23 through a line k5, and connected to the analysis and display device 19 through a line k6. The optical switch controller 24 is configured to include electronic circuits such as a CPU, a ROM, a RAM, and various types of interfaces. The optical switch controller is configured to read out a program stored in the ROM to develop the program in the RAM, and perform various processes.

The optical switch controller 24 selects one radiation detection unit from among the radiation detection units 111 to 11n. Then, the optical switch controller 24 controls the optical switch 23 to guide the light from the light emission unit 12 to the one radiation detection unit, and to guide the light from the radiation detection unit to the wavelength selection unit 16.

When the maintenance and the operation confirmation of the radiation monitor 100C are performed, for example, the optical switch 23 is controlled such that the light from the light emission unit 12 is guided to the radiation detection unit 111, and the light from the radiation detection unit 111 is guided to the optical branching unit 14. In this state, similarly to the first embodiment, the degradation of the radiation detection element 111a is determined. Further, the information indicating a selected one of the radiation detection units 111 to 11n is transmitted from the optical switch controller 24 to the analysis and display device 19 through the line k6.

In addition, the light emission wavelengths of the radiation detection elements 111a to 11na may be identical or not.

In a case where the light emission wavelengths of the radiation detection elements 111a to 11na are identical, the measurement device 18 controls the wavelength selection unit 16 in the first mode of the wavelength selection unit 16 such that the photons of the light emission wavelength of the target radiation detection element pass through the wavelength selection unit 16, and the light of the other wavelengths are blocked.

After a series of "maintenances" related to the radiation detection element 111a and the optical fiber 151a are performed, the "maintenances" are sequentially performed even on the radiation detection element 112a and the optical fiber 152a (also "operation confirmation"). Further, the processes of the maintenance and the operation confirmation of the radiation monitor 100C are similar to those of the first embodiment, and the description thereof will be omitted.

<Effects>

According to the fourth embodiment, the count rate related to one selected by the optical switch controller 24 from among the radiation detection units 111 to 11n is calculated by the analysis and display device 19. With this configuration, the dose rate can be measured at plural positions in the nuclear power plant. In addition, it is possible to determine whether the radiation detection elements 111a to 11na and the optical fibers 151a to 15na are degraded.

In addition, even in the configuration where the plurality of radiation detection units 111 to 11n is provided, one light emission unit 12 is enough. Therefore, it is possible to reduce the cost required for the light emission unit 12 compared to the configuration where a plurality of the light emission units 12 is provided.

Modifications

Hitherto, the embodiments of the radiation monitor 100 according to the invention have been described, but the invention is not limited thereto. Various modifications may be made.

For example, in the first embodiment, the radiation monitor 100 (see FIG. 1) has been described to be configured to include the optical branching unit 14, but the optical branching unit 14 may be omitted.

Figure 19:
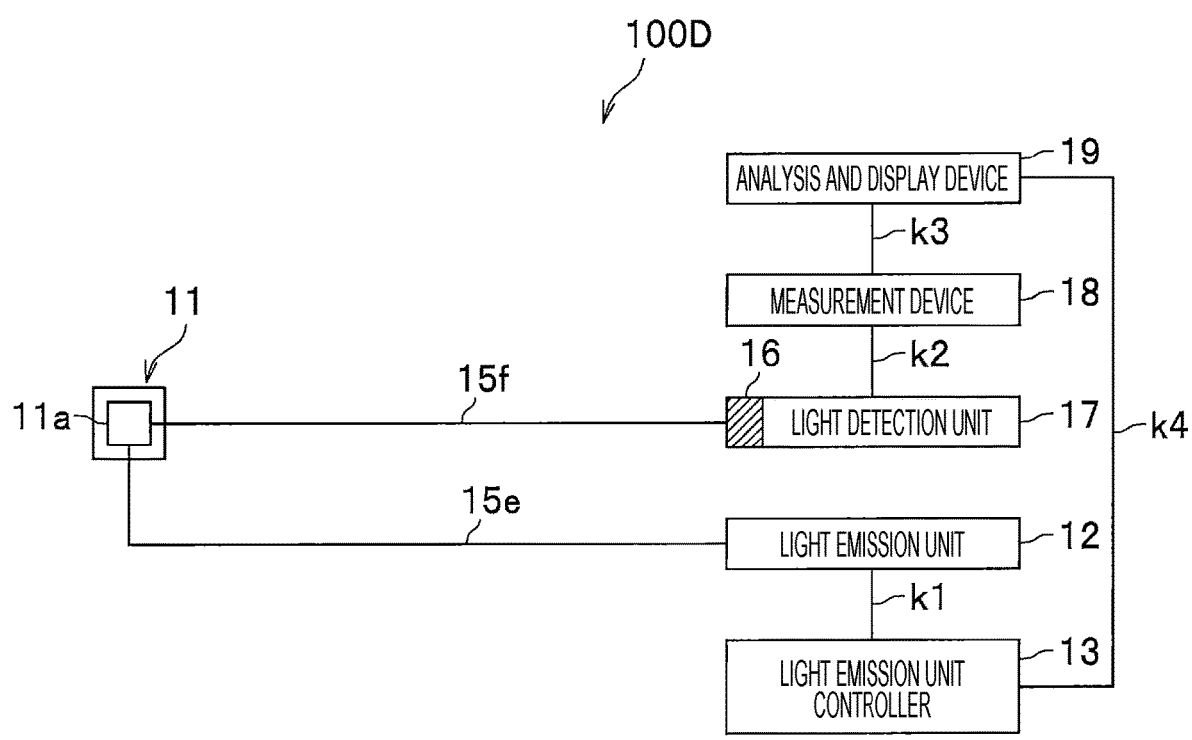
FIG. 19 is a diagram illustrating a configuration of a radiation monitor according to a modification of the invention.

FIG. 19 is a diagram illustrating a configuration of a radiation monitor 100D according to a modification.

As illustrated in FIG. 19, the light emission unit 12 and a radiation detection element 11a may be connected through an optical fiber 15e. The radiation detection element 11a and the wavelength selection unit 16 may be connected through another optical fiber 15f. Even in such a configuration, the same effects as the first embodiment are achieved.

Further, the second to fourth embodiments may be configured similarly as described above.

In addition, the wavelength λ of the light emission unit 12 may be changed in the "calibration" of step S115 described in the first embodiment (see FIG. 6). In this case, the analysis and display device 19 specifies a degree of degradation of the optical fiber 15 a on the basis of a plurality of points (λ, τ) specified by the wavelength λ of the light emission unit 12 and the transmittance τ of the light in the optical fiber 15a.

In addition, in the second embodiment, the radiation monitor 100A (see FIG. 15) has been described to include the attenuation filters 21 and 22, but the invention is not limited thereto.

In other words, one of the attenuation filters 21 and 22 may be omitted.

In addition, in the embodiments, the light emission unit controller 13, the measurement device 18, and the analysis and display device 19 have been described to be configured separately, but the invention is not limited thereto. In other words, there may be provided a device which is configured to have a plurality of functions of the light emission unit controller 13, the measurement device 18, and the analysis and display device 19.

In addition, the embodiments may be appropriately combined.

For example, the second embodiment and the third embodiment may be combined to include the plurality of radiation detection elements 111a to 11na having different light emission wavelengths, and to include the attenuation filters 21 and 22.

Similarly, the second embodiment and the fourth embodiment may be combined.

In addition, in the embodiments, the radiation monitor 100 has been described to be provided in the nuclear power plant. However, as an installation place of the radiation monitor 100, the following places may be exemplified. In other words, the radiation monitor may be installed in a used-fuel storage pool in the nuclear power plant, inside or outside of a reactor pressure vessel, inside or outside a reactor container vessel, inside or outside a suppression pool, inside or outside a reactor building, in a reprocessing facility, etc.

In addition, the radiation monitor 100 may be installed in a radiomedical facility, or may be used to detect fuel debris (which is resulted from cooling and solidification of melt-fuel of the nuclear reactor).

In addition, the embodiments have been described in detail in order to help with understanding on the invention, but the invention is not limited to the one equipped with all the configurations. In addition, some of the configurations of the embodiments may be added, omitted, or replaced with other configurations. In addition, the mechanisms and the configurations described above are ones considered as necessary for the explanation, but not represent all the mechanisms and the configurations in term of a product.

REFERENCE SIGNS LIST 100, 100A, 100B, 100C, 100D radiation monitor
11, 111, 112, . . . , 11n radiation detection unit
11a, 111a, 112a, . . . , 11na radiation detection element
12 light emission unit
13 light emission unit controller (control unit)
14 optical branching unit
15a, 15b, 15c, 15d, 15e, 15f, 151a, 152a, . . . , 15na optical fiber (optical transmission line)
16 wavelength selection unit
17 light detection unit
18 measurement device (control unit)
19 analysis and display device (control unit)
21, 22 attenuation filter
23 optical switch
24 optical switch controller (control unit)

The invention claimed is:

1. A radiation monitor, comprising:
a radiation detection unit which includes a radiation detection element, the radiation detection element sensing radiation and light, and emitting light of a predetermined light emission wavelength when receiving the radiation or the light;
a light emission unit which emits light of a wavelength different from the light emission wavelength;
a wavelength selection unit which passes the light of the light emission wavelength, and is set to a first mode to block the light from the light emission unit;
an optical transmission line which transmits the light from the light emission unit to the radiation detection unit, and transmits the light from the radiation detection unit to the wavelength selection unit;
a light detection unit which converts the light passing through the wavelength selection unit into an electric pulse; and
a control unit which measures a count rate of the electric pulse, and determines whether at least the light emission unit is degraded on the basis of the count rate and a light intensity of the light emission unit,
wherein the control unit is configured to
include a memory unit which stores first light intensity-count rate information indicating a relation between the light intensity of the light emission unit when it is already known that the radiation monitor functions normally and the count rate in a state where the wavelength selection unit is set to the first mode, and
set the wavelength selection unit to the first mode in maintenance of the radiation monitor which is performed in a state where a dose rate of radiation incident on the radiation detection element is at a level of natural radiation and determine, on the basis of a setting value of a predetermined light intensity, that the light emission unit is degraded when an actual light intensity of the light emission unit is smaller than the setting value in a case where the count rate caused by light emitted from the light emission unit is lowered below the first light intensity-count rate information.

2. The radiation monitor according to claim 1,
wherein the wavelength selection unit further includes a second mode in which the light from the light emission unit passes, and the light of the light emission wavelength is blocked,
wherein the memory unit stores second light intensity-count rate information indicating the relation between the light intensity of the light emission unit and the count rate when it is already known that the radiation monitor functions normally in a state where the wavelength selection unit is set to the second mode, and
wherein the control unit sets the wavelength selection unit to the second mode when the actual light intensity of the light emission unit is not smaller than the setting value in a case where the count rate in the first mode is lowered below the first light intensity-count rate information, and determines that the optical transmission line is degraded in a case where the count rate caused by the light emitted from the light emission unit is lowered below the second light intensity-count rate information.

3. The radiation monitor according to claim 2,
wherein the memory unit is configured to
store wavelength-transmittance information in which a relation between a wavelength and a transmittance of the light in the optical transmission line is associated with a numerical value indicating a degree of degradation of the optical transmission line, and
store count rate-dose rate information indicating a relation between the count rate and the dose rate of radiation incident on the radiation detection element, and
wherein, in a case where it is determined that the optical transmission line is degraded, the control unit calibrates the count rate-dose rate information on the basis of a wavelength of the light of the light emission unit which is transmitted through the optical transmission line, the transmittance of the light in the optical transmission line, and the wavelength-transmittance information.

4. The radiation monitor according to claim 2,
wherein, in a case where the count rate in the first mode is lowered below the first light intensity-count rate information, the control unit determines that the radiation detection element is degraded when the actual light intensity of the light emission unit is not smaller than the setting value, and the count rate in the second mode is not lowered below the second light intensity-count rate information.

5. The radiation monitor according to claim 1,
wherein the control unit is configured to set the wavelength selection unit to the first mode in an operation confirmation of the radiation monitor which is performed in a state where a dose rate of radiation incident on the radiation detection element is higher than a level of natural radiation, and to determine, on the basis of a setting value of a predetermined light intensity, that the light emission unit is degraded when an actual light intensity of the light emission unit is smaller than the setting value in a case where the count rate caused by the light emitted from the light emission unit is lowered in a state where the setting value is kept.

6. The radiation monitor according to claim 5, wherein the wavelength selection unit further includes a second mode in which the light from the light emission unit passes, and the light of the light emission wavelength is blocked,
wherein the control unit is configured to
include a memory unit which stores second light intensity-count rate information indicating a relation between the light intensity of the light emission unit when it is already known that the radiation monitor functions normally in a state where the wavelength selection unit is set to the second mode and the count rate, and
set the wavelength selection unit to the second mode when the actual light intensity of the light emission unit is not smaller than the setting value in a case where the count rate is lowered in a state where the setting value is kept, and determine that the optical transmission line is degraded in a case where the count rate caused by the light emitted from the light emission unit is lowered below the second light intensity-count rate information.

7. The radiation monitor according to claim 6, wherein the memory unit is configured to
store wavelength-transmittance information in which a relation between a wavelength and a transmittance of the light in the optical transmission line is associated with a numerical value indicating a degree of degradation of the optical transmission line, and
store count rate-dose rate information indicating a relation between the count rate and the dose rate of radiation incident on the radiation detection element, and
wherein, in a case where it is determined that the optical transmission line is degraded, the control unit calibrates the count rate-dose rate information on the basis of a wavelength of the light of the light emission unit which is transmitted through the optical transmission line, the transmittance of the light in the optical transmission line, and the wavelength-transmittance information.

8. The radiation monitor according to claim 6, wherein the control unit is configured to set the wavelength selection unit to the first mode when the actual light intensity of the light emission unit is not smaller than the setting value and the count rate in the second mode is not lowered below the second light intensity-count rate information in a case where the count rate is lowered in a state where the setting value is kept, and determine that the radiation detection element is degraded in a case where the count rate caused by the light emitted from the light emission unit is lowered below the first light intensity-count rate information.

9. The radiation monitor according to claim 6, wherein the control unit is configured to set the wavelength selection unit to the first mode when the actual light intensity of the light emission unit is not smaller than the setting value and the count rate in the second mode is not lowered below the second light intensity-count rate information in a case where the count rate is lowered in a state where the setting value is kept, and determine that a dose rate of radiation incident on the radiation detection element varies in a case where the count rate caused by the light emitted from the light emission unit is not lowered below the first light intensity-count rate information.

10. The radiation monitor according to claim 1, further comprising:

an optical branching unit which branches the light from the radiation detection unit toward the light emission unit and the wavelength selection unit,
wherein the light from the light emission unit is transmitted to the radiation detection unit through the optical transmission line and the optical branching unit.

11. The radiation monitor according to claim 1, wherein a plurality of the radiation detection units each include the radiation detection element which has a different light emission wavelength, and
wherein, in the first mode, the wavelength selection unit passes the light of the light emission wavelength of the radiation detection element selected by the control unit, and blocks the light of the other wavelengths.

12. The radiation monitor according to claim 1, further comprising:
an optical switch which guides the light from the light emission unit to the radiation detection unit selected by the control unit from among a plurality of the radiation detection units, and guides the light from the radiation detection unit selected by the control unit to the wavelength selection unit.

13. The radiation monitor according to claim 1, further comprising:
at least one of an attenuation filter which is installed in the light emission unit, and another attenuation filter which is interposed between the wavelength selection unit and the light detection unit.

14. A method of analyzing a radiation monitor, comprising:
emitting, from a light emission unit, light of a wavelength different from the light emission wavelength of a radiation detection element, the radiation detection element sensing radiation and light and emitting light of a predetermined light emission wavelength when receiving the radiation or the light;
converting, by a control unit, the light incident through a wavelength selection unit which selectively passes the light of the light emission wavelength into an electric pulse and measures a count rate of the electric pulse, the wavelength selection unit being set to a first mode to block the light from the light emission unit;
determining whether at least the light emission unit is degraded on the basis of a count rate of the electric pulse and a light intensity of the light emission unit;
transmitting light from the light emission unit to the radiation detection unit and transmitting the light from the radiation detection unit to the wavelength selection unit;
storing in a memory unit first light intensity-count rate information indicating a relation between the light intensity of the light emission unit when it is already known that the radiation monitor functions normally and the count rate in a state where the wavelength selection unit is set to the first mode; and
setting the wavelength selection unit to the first mode in maintenance of the radiation monitor and performing the maintenance in a state where a dose rate of radiation incident on the radiation detection element is at a level of natural radiation and determining, on the basis of a setting value of a predetermined light intensity, that the light emission unit is degraded when an actual light intensity of the light emission unit is smaller than the setting value in a case where the count rate caused by light emitted from the light emission unit is lowered below the first light intensity-count rate information.

\* \* \* \* \*